(12) United States Patent
Yamaguchi

(10) Patent No.: US 8,522,844 B2
(45) Date of Patent: Sep. 3, 2013

(54) PNEUMATIC TIRE WITH HEAT DISSIPATING SIDE PORTION

(75) Inventor: Masashi Yamaguchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 944 days.

(21) Appl. No.: 11/661,209

(22) PCT Filed: Sep. 13, 2006

(86) PCT No.: PCT/JP2006/318190
§ 371 (c)(1),
(2), (4) Date: Nov. 13, 2007

(87) PCT Pub. No.: WO2007/032405
PCT Pub. Date: Mar. 22, 2007

(65) Prior Publication Data
US 2009/0032161 A1 Feb. 5, 2009

(30) Foreign Application Priority Data
Sep. 13, 2005 (JP) ................. P2005-265019

(51) Int. Cl.
*B60C 23/19* (2006.01)
*B60C 17/00* (2006.01)
*B60C 13/02* (2006.01)

(52) U.S. Cl.
USPC ............ 152/153; 152/517; 152/523

(58) Field of Classification Search
USPC ........................ 152/153, 517, 523
See application file for complete search history.

(56) References Cited

U.S. PATENT DOCUMENTS

| 3,414,036 | A | * | 12/1968 | Skidmore | 152/153 |
| 3,911,987 | A | * | 10/1975 | Takusagawa et al. | 152/517 |
| 4,193,437 | A | * | 3/1980 | Powell | 152/517 |
| 5,332,016 | A | * | 7/1994 | Tsuruta et al. | 152/523 |
| 2002/0166619 | A1 | | 11/2002 | Shimazaki | |
| 2004/0003881 | A1 | | 1/2004 | Ebiko | |

FOREIGN PATENT DOCUMENTS

| DE | 2 423 622 | | 12/1974 |
| DE | 44 29 796 A1 | | 2/1996 |
| GB | 1 471 883 | | 4/1977 |
| JP | 48-33002 U | | 4/1973 |
| JP | -06234309 A | * | 8/1994 |
| JP | 8-197917 A | | 8/1996 |
| JP | 8-282218 A | | 10/1996 |
| JP | 8-337104 A | | 12/1996 |
| JP | 10-34766 A | | 2/1998 |
| JP | 11-321242 | | 11/1999 |
| JP | 2001-39129 A | | 2/2001 |
| JP | 2001-206024 A | | 7/2001 |
| JP | 2002-059712 | | 2/2002 |
| JP | 2003-237317 A | | 8/2003 |
| JP | 2003-246209 A | | 9/2003 |
| JP | 2004-34860 A | | 2/2004 |
| JP | 2006-248317 A | | 9/2006 |
| JP | 2006-248318 A | | 9/2006 |
| JP | 2006-272992 A | | 10/2006 |

OTHER PUBLICATIONS

English machine translation of DE 44 29 796 A1, Feb. 29, 1996.*
English machine translation of JP 10-34766 A, Feb. 10, 1998.*
English machine translation of JP 2003-246209 A, Sep. 2, 2003.*
English machine translation of JP 6-234309 A, Aug. 23, 1994.*
Mechanics of Pneumatic Tires, ed. Samuel Clark, U.S. Department of Transportation, Aug. 1981, p. 225.*
Supplementary European Search Report dated Oct. 2, 2008 (6 pages).
Chinese Office Action (with translation) dated Apr. 1, 2010 (9 pages).
European Search Report dated Sep. 23, 2009.
Japanese Office Action dated Feb. 5, 2013 issued in JP Patent Application No. 2011-168844.

* cited by examiner

*Primary Examiner* — Adrienne C Johnstone
(74) *Attorney, Agent, or Firm* — Sughrue Mion, PLLC

(57) ABSTRACT

To provide a pneumatic tire having a tire side portion with an enhanced durability according to the present invention, a run flat tire (1) has a turbulent generating concavo-convex part (5) composed of grooves and ribs and extending along at least part of a tire side portion, and a pattern is set to the turbulent generating concavo-convex part (5), in which for the turbulent generating concavo-convex part (5), letting h be a height, p be a pitch, and w be a width, a relationship is met such that $1.0 \leqq p/h \leqq 50.0$, and $1.0 \leqq (p-w)/w \leqq 100.0$.

10 Claims, 21 Drawing Sheets

PNEUMATIC TIRE WITH HEAT DISSIPATING SIDE PORTION

TECHNICAL FIELD

The present invention relates to a pneumatic tire, and particularly, to a pneumatic tire adapted for reduction of temperatures at a tire side portion where deteriorations tend to develop.

BACKGROUND ART

The pneumatic tire may have raised temperatures accompanied by, among others, promotion of temporal variations such as changes in property of materials, or causation to a break or such in a high-speed running, which is unfavorable from a viewpoint of durability. In particular, for a truck bus radial (TBR) tire or off-road radial (ORR) tire to be heavy-loaded in use, or for a run flat tire in a flat run (running with an internal pressure of 0 kPa), the reduction of tire temperature has been a significant desideratum for enhancement of durability. For example, a run flat tire has reinforcing rubber crescents, which become very hot with concentrated radial deformations in a flat run, giving a significant influence on durability.

In a known relevant art for a promoted heat dissipation of pneumatic tire, a flat pneumatic tire provided with a rim guard has many ridges disposed on the rim guard to provide an increased surface area for promotion of heat dissipation.

In the above-noted art for a promoted heat dissipation of pneumatic tire, the tire has an increased surface area for promotion of heat dissipation, while additional enhancement in efficiency of heat dissipation is desirable.

DISCLOSURE OF INVENTION

It therefore is an object of the present invention to provide a pneumatic tire with a still enhanced durability by efficient temperature reduction at a portion where deteriorations tend to occur in a variety of pneumatic tires.

For solution of the objective described, the present inventor has committed studies in view of a tire surface deformable for enhancement in efficiency of heat dissipation, finding that the efficiency of heat dissipation can be still enhanced by provision of a tire-outer lateral side or tire-inner lateral side with tire-radially arranged grooves or ribs defined in shape.

According to an aspect of the present invention, a pneumatic tire has a tire side portion comprising a turbulent generating concavo-convex part extending along at least part thereof and composed of grooves and ribs, wherein for the ribs, letting h be a height, p be a pitch, and w be a width, a relationship is met such that $1.0 \leq p/h \leq 50.0$, and $1.0 \leq (p-w)/w \leq 100.0$.

In respect of the invention, a tire side portion with a tendency for a failure to occur is provided with a turbulent generating concavo-convex part, thereby allowing heat dissipation of the tire side portion to be promoted with turbulent flows of air generated at the turbulent generating concavo-convex part. The tire is made of a rubber material with a bad heat conductivity, and for the heat dissipation, a greater effect is expectable by promoting turbulent generation to have turbulent air flows directly hitting the tire side portion, than having an expanded radiation area for heat dissipation to be promoted.

The present invention is applicable for a temperature reducing effect to be increased at a tire side portion provided with a turbulent generating concave-convex part, in particular to such a pneumatic tire that has a tire side portion with a tendency for a failure to occur in part relative to other portions, like a TBR having a tire side portion where carcass is ended, or a run flat tire having a tire side portion provided with reinforcing rubber crescents.

It is now noted that for the ribs, a ratio (p/h) of the pitch (p) and the height (h) may be specified within a range of $2.0 \leq p/h \leq 24.0$, preferably within a range of $10.0 \leq p/h \leq 20.0$, for enhancement of heat transfer at surfaces of the tire side portion.

Like above, a range of p/h may be specified for possible arrangement of the state of (turbulent) air flow which roughly depends on p/h, in consideration of flows of air that may fail to find ways at bottoms of the grooves if the pitch (p) is carved too small, and of a condition like absence of a turbulent generating concavo-convex part processed in shape, to be hit if the pitch (p) is over-widened.

It also is noted that for the pitch (p), a proportion of width (w) with respect to the part of a rib is referred to (p−w)/w. If set too small, this is like that for the areas of (groove) surfaces where enhancement of heat dissipation is desired, the surface areas of ribs have equivalent proportions. For the ribs made of a rubber, enhancement of the effect on heat dissipation due to an increase in surface area is little expectable, so that (p−w)/w has a minimal value specified to 1.0. The (p−w)/w may be specified within such a range that $1.0 \leq (p-w)/w \leq 100$, for example $5 \leq (p-w)/w \leq 100$, preferably such that $4 \leq (p-w)/w \leq 39.0$.

In a pneumatic tire according to the above-noted aspect, the turbulent generating concavo-convex part may have an extending direction making an angle θ with a tire-radial direction, within a range of $-70° \leq \theta \leq 70°$, preferably within a range of $45° \leq \theta \leq 45°$, more preferably $-20 \leq \theta \leq 20°$.

Further, for the turbulent generating concavo-convex part, the ribs may preferably have vertices at tire-radially inner ends thereof.

Moreover, the ribs may preferably have ridges at least at tire-radially inner ends thereof.

The pneumatic tire is a body of revolution, and flows of air along surfaces of the tire side portion are biased by centrifugal forces to move radially outward, though a little. And, at the ribs, stagnant regions accrue behind influent air. For their reduction to enhance heat dissipation, the inclination to a radial direction may preferably be set within the above-noted range.

Still more, the turbulent generating concavo-convex part may have an extending direction making an angle θ with a tire-radial direction, varied depending on a tire-radial position. For the pneumatic tire in revolution, the flow of air has a different flow velocity depending on the radial position, so that the angle the extending direction of turbulent generating concavo-convex part makes with the radial direction may preferably be varied depending on the radial position.

In addition, the turbulent generating concavo-convex part may be divided to be discontinuous in the extending direction. Further, the turbulent generating concavo-convex part may be unevenly arranged along a tire-circumferential direction. In this connection, for the ribs provided on a surface of the tire side portion, there accrue stagnant regions behind influent air, worsening heat dissipation in part in comparison with the case of no provision of ribs. In order for elimination of such parts as worsened of heat dissipation to enhance the heat transfer in average, it may be effective for the turbulent generating concavo-convex part to be divided so as to be discontinuous in the extending direction.

Yet more, according to the invention, among others, a heavy-load-oriented tire, and a run flat tire provided with reinforcing rubber crescents at a tire side portion may have reduced temperatures at their tire side portions.

BEST MODE FOR CARRYING OUT THE INVENTION

There will be detailed pneumatic tires according to embodiments of the present invention, with reference to the drawings.

First Embodiment

Figure 1:
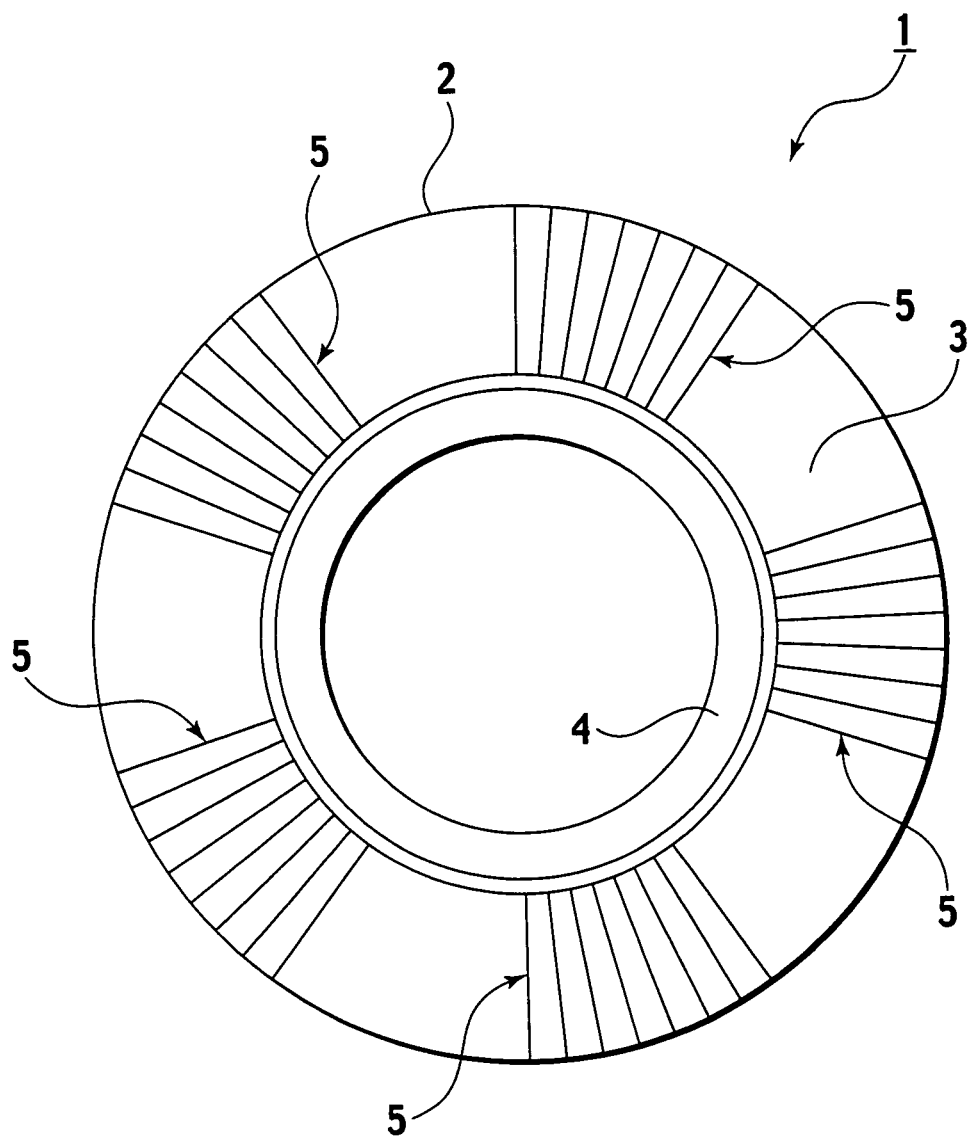
FIG. 1 is a side view of a run flat tire according to a first embodiment of the present invention.
Figure 2:
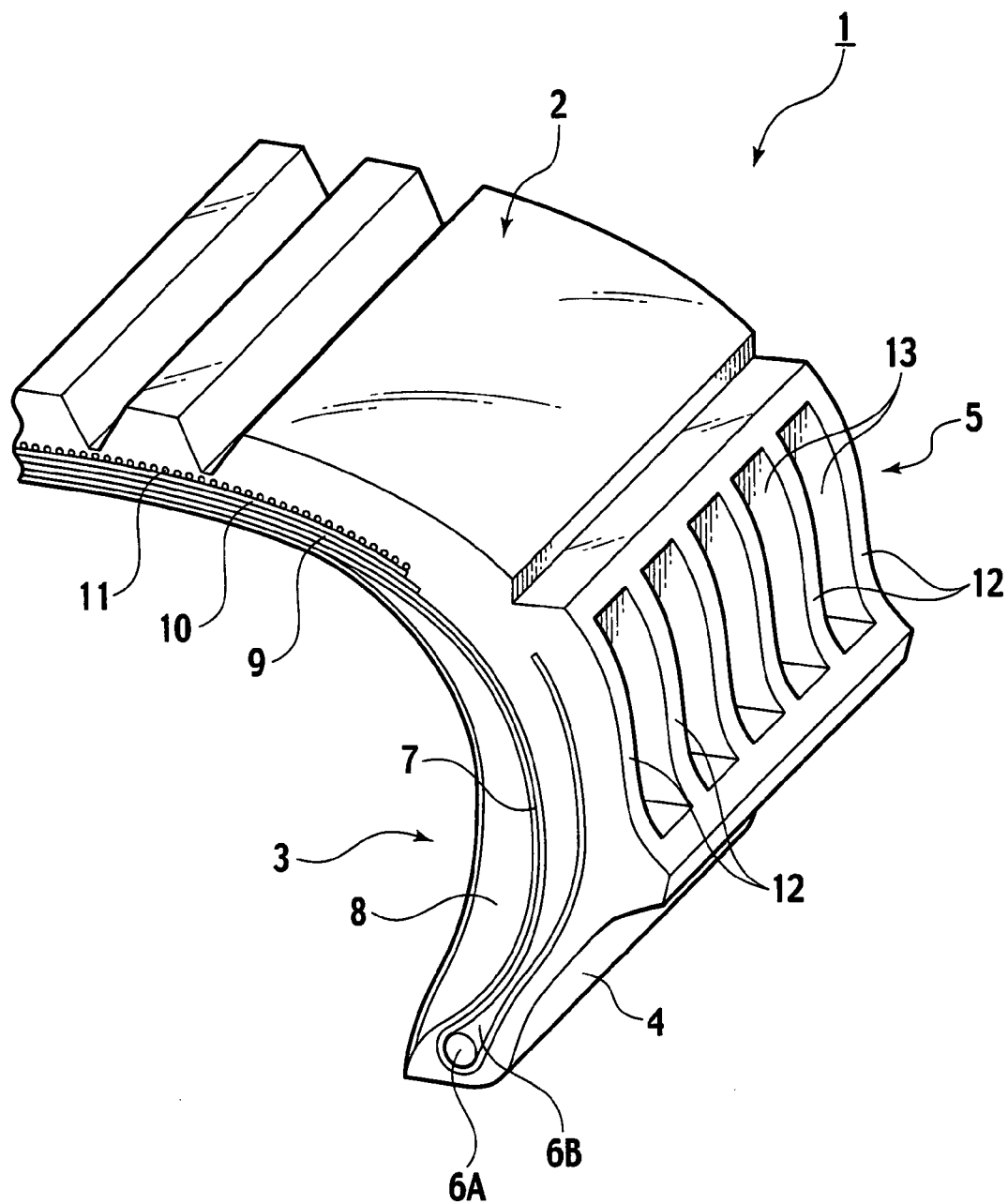
FIG. 2 is a perspective view, with a section of an essential portion, of the run flat tire according to the first embodiment of the present invention.
Figure 3:
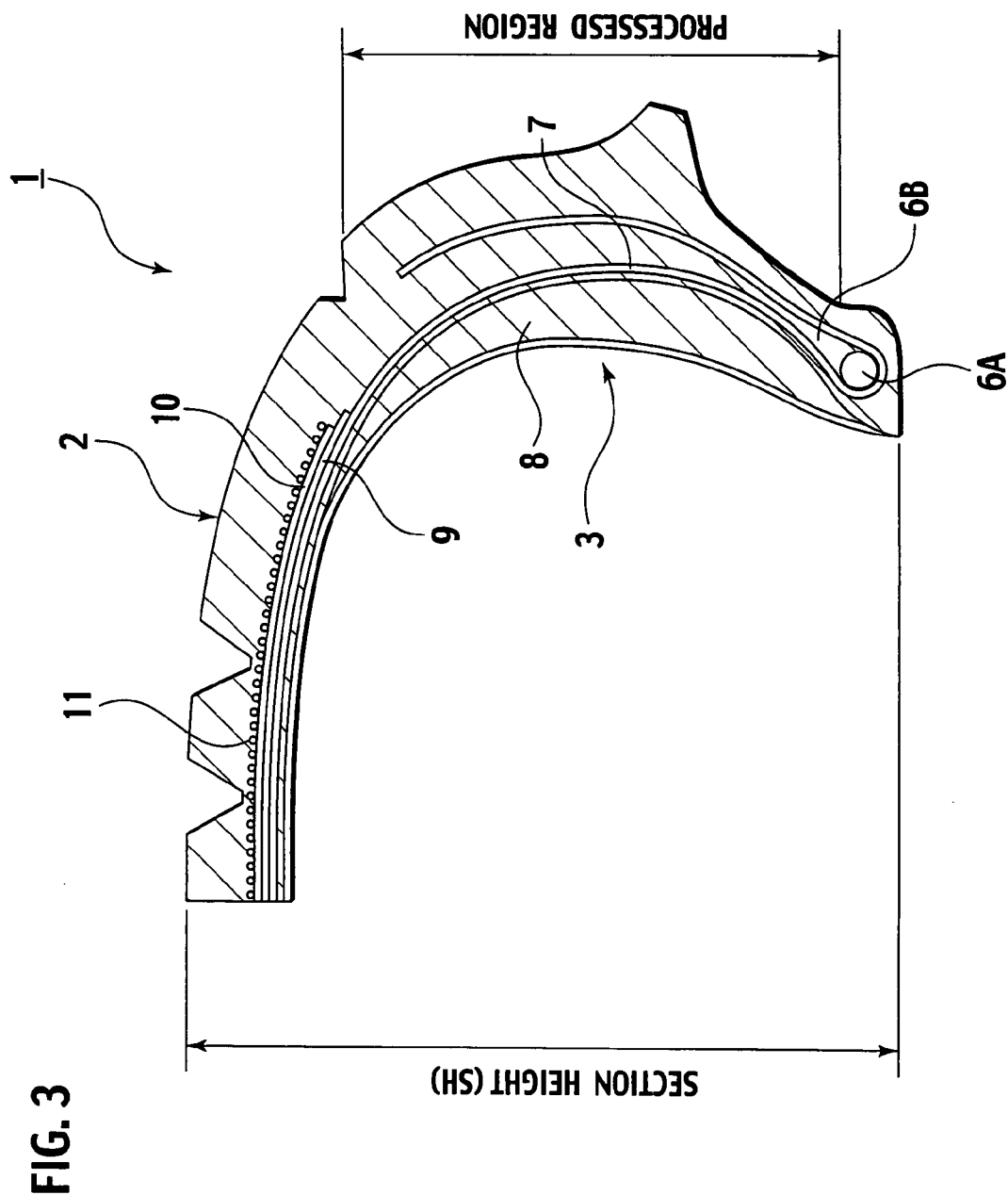
FIG. 3 is a sectional view, as a section of the essential portion, of the run flat tire according to the first embodiment of the present invention.
Figure 4:
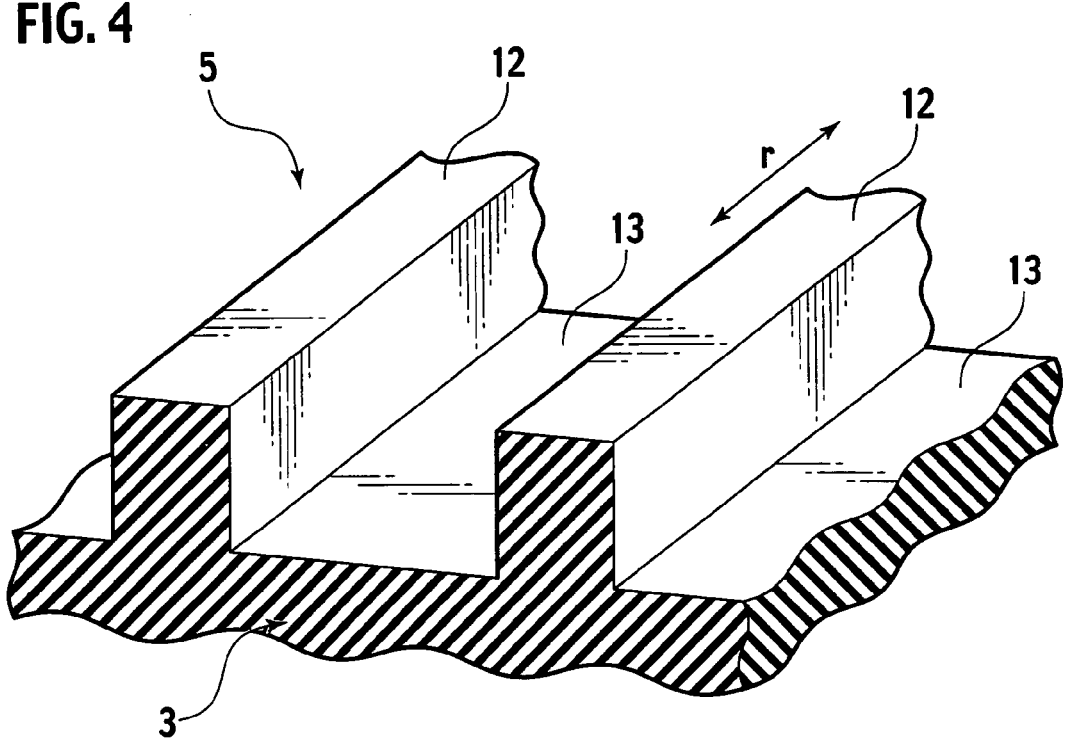
FIG. 4 is a perspective view of an essential portion of a turbulent generating concavo-convex part of the run flat tire according to the first embodiment of the present invention.
Figure 5:
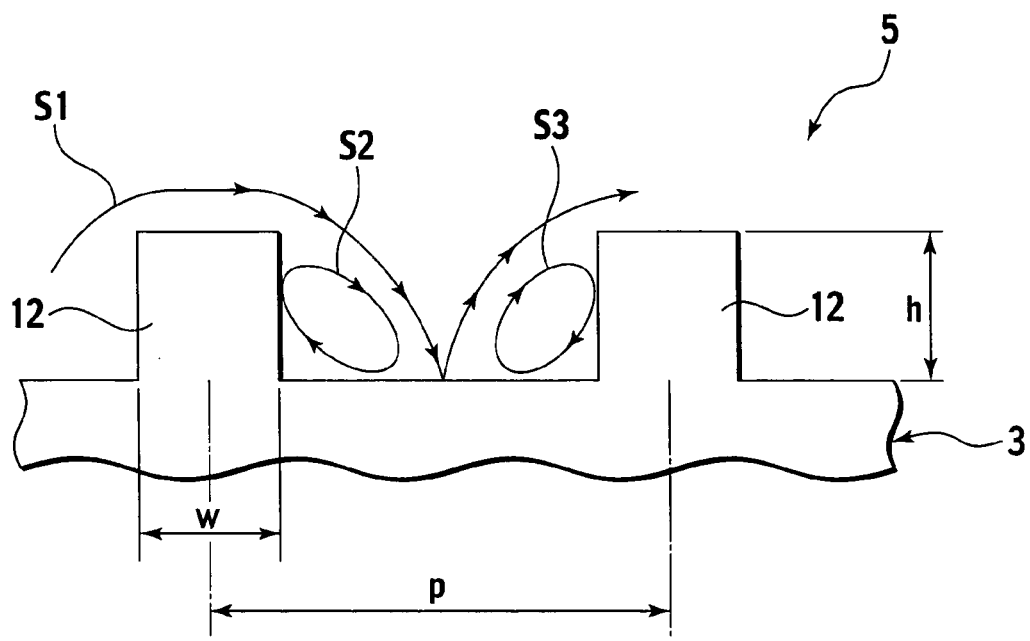
FIG. 5 is a sectional illustration depicting a state of turbulent generation at the turbulent generating concavo-convex part of the run flat tire according to the first embodiment of the present invention.
Figure 6:
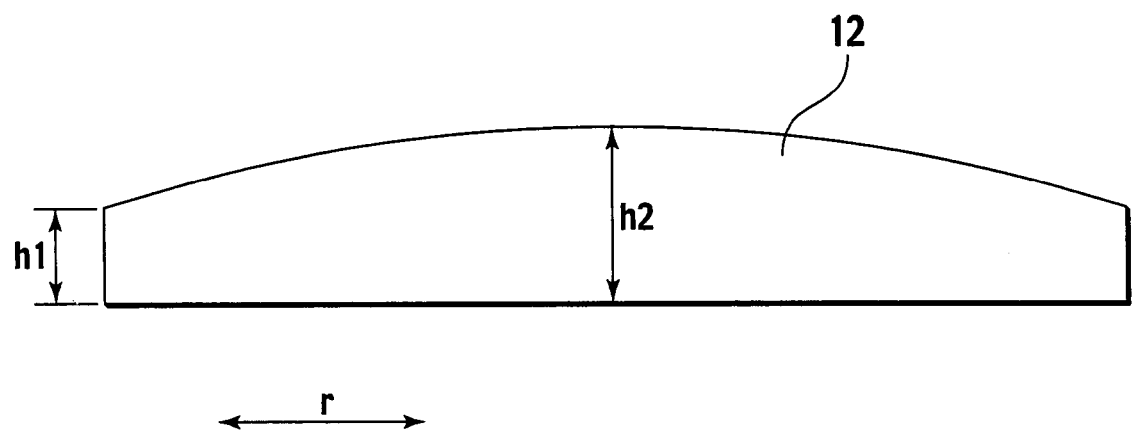
FIG. 6 is a side view of the turbulent generating concavo-convex part of the run flat tire according to the first embodiment of the present invention.

FIG. 1 to FIG. 3 show a run flat tire 1 as a pneumatic tire according to a first embodiment of the present invention, and FIG. 4 to FIG. 6 show a turbulent generating concavo-convex part 5 provided to a tire side portion 3 of the run flat tire 1. FIG. 1 is a side view of the run flat tire 1; FIG. 2, a perspective view of an essential portion of the run flat tire 1; FIG. 3, a sectional view, as a radial section, of the essential portion of the run flat tire 1; FIG. 4, a perspective view of an essential portion of the turbulent generating concavo-convex part 5; FIG. 5, a sectional view of the turbulent generating concavo-convex part 5; and FIG. 6, a side view of a rib of the turbulent generating concavo-convex part 5 seen in a tire-circumferential direction.

<General Configuration of Run Flat Tire>

As shown in FIG. 1 to FIG. 3, the run flat tire 1 is made up by a tread portion 2 to be brought into contact with a road surface, tire side portions 3 at both sides of the tire, and bead portions 4 provided along open edges of the tire side portions 3.

As shown in FIG. 1, each tire side portion 3 is provided with a plurality of (five, in this embodiment) intermittent turbulent generating concavo-convex parts 5 along a circumferential direction. It is noted that the turbulent generating concavo-convex parts 5 are formed within a range (processed range) of the tire side portion 3, which ranges, as shown in FIG. 3, from 10 to 90% of a section height (SH) relative to a base line of a rim (not shown).

As shown in FIG. 1 and FIG. 2, each bead 4 is provided with a bead core 6A and a bead filler 6B, which circumferentially extend like a circle, along an edge of an opening of either tire side portion 3. As the bead core 6A, specifically, a steel code or the like is used.

As shown in FIG. 2 and FIG. 3, the run flat tire 1 has a carcass layer 7 as a framework of the tire. At an inside (tire-transversely inner side) of the carcass layer 7 corresponding in position to the tire side portion 3, there is a side wall reinforcing layer 8 provided for reinforcement of the tire side portion 3. The side wall reinforcing layer 8 is made up by rubber stocks of a crescent form in a tire-transverse section.

At a tire-radially outer side of the carcass layer 7, there is a belt layer composed of a plurality of layers (steel belt layers 9 and 10, and circumferential reinforcing layer 11). Provided at a tire-radially outer side of the circumferential reinforcing layer 11 is the tread portion 2 to be brought into contact with a road surface.

<Configuration of Turbulent Generating Concavo-Convex Parts>

As shown in FIG. 2, FIG. 4, and FIG. 5, for the run flat tire 1 according to the present embodiment, each turbulent generating concavo-convex part 5 formed thereto includes a plurality of ribs (convexed stripes) 12 arrayed, on a surface region at an outside of the tire side portion 3, so as to extend substantially along a radial direction r, and grooves 13 between the ribs 12. As shown in FIG. 5, those ribs 12 neighboring each other in a tire-circumferential direction are set to a mutually identical height, and like the height (h) of ribs 12, a pitch (p) is given for the ribs 12 to be mutually set thereto. It is noted that, as shown in FIG. 5, the pitch (p) is a distance between points that bisect widths at centers in extending direction of the ribs 12.

In the present embodiment, as shown in FIG. 6, for each rib 12, the height is set so as to gradually rise about a center in an extending direction of the rib 12 (substantially identical to the tire-radial direction r), with a greater height ($h_2$) at a center of the rib 12 in the extending direction of the rib 12, than heights ($h_1$) at the ends in the extending direction of the rib 12. The height (h) of rib 12 will be referred to the central height ($h_2$). It is noted that, for the height of rib 12 in the present embodiment, the central height ($h_2$) may be set equal to the heights ($h_1$) at the ends.

Figure 7:
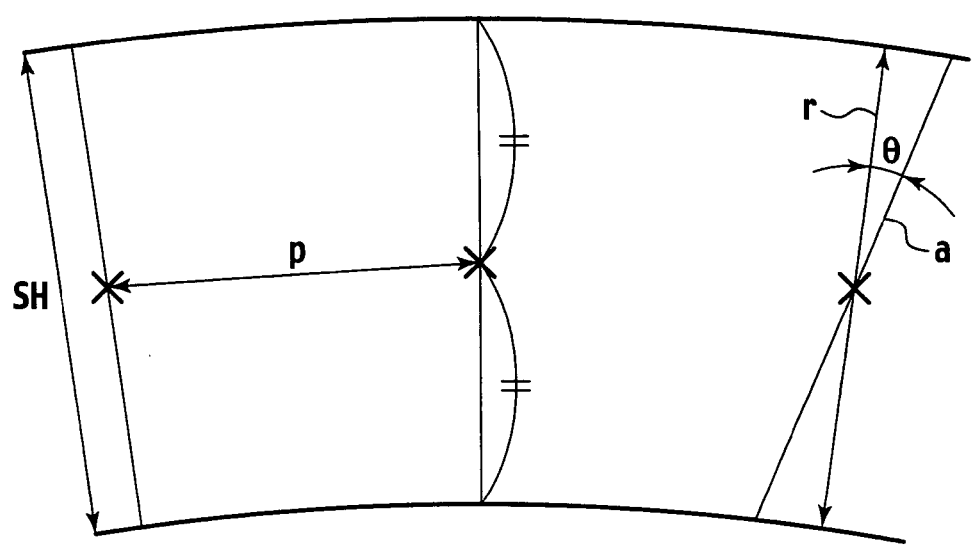
FIG. 7 is an illustration depicting a pitch p and an angle θ of the turbulent generating concavo-convex part of the run flat tire according to the first embodiment of the present invention.

As shown in FIG. 7, for rib(s) 12, θ is assumed as an angle that the extending angle a makes with the tire-radial direction r.

The turbulent generating concavo-convex parts 5 are intermittently provided along a circumferential direction of the tire side portion 3, as described. For a respective turbulent generating concavo-convex part 5 composed of ribs 12 and grooves 13 at least in part of the tire side portion 3, the extending direction is set at an angle θ. For the turbulent generating concavo-convex part 5, the ribs 12 are set to have, between the height (h) and the pitch (p) and the width (w), such a relationship that $1.0 \leq p/h \leq 50.0$, and a relationship met such that $1.0 \leq (p-w)/w \leq 100.0$. For the ribs, the ratio (p/h) of the pitch (p) and the height (h) may preferably be specified within a range of $2.0 \leq p/h \leq 24.0$, more preferably within $0.0 \leq p/h \leq 20.0$, for enhancement of heat transfer at surfaces of the tire side portion.

In the present embodiment, the tire side portion 3, which has a greater tendency for deteriorations to occur than other portions, is provided with the turbulent generating concavo-convex parts 5, thereby allowing heat dissipation of the tire side portion 3 to be promoted with turbulent flows of air generated at the turbulent generating concavo-convex parts 5. The tire is made of a rubber material with a bad heat conductivity, and for the heat dissipation, a greater effect is expectable by promoting turbulent generation to have turbulent air flows directly hitting the tire side portion, than having an expanded radiation area for heat dissipation to be promoted.

There can be achieved an enhanced temperature reducing effect at the tire side portion 3, in particular for a pneumatic tire that has a tire side portion 3 with a tendency for a failure to occur in part in a long service relative to other portions, such as a TBR (truck bus radial) or a run flat tire 1 having a tire side portion 3 provided with reinforcing rubber crescents, or a heavy-load-oriented tire.

The (turbulent) flows of air specified by p/h, as above, fail to find ways at bottoms of the grooves if the pitch (p) is carved too small, that is, if the pitch (p) gets narrower, and have a condition like absence of a turbulent generating concavo-convex part processed in shape, to be hit if the pitch (p) is over-widened, so that they may preferably be set within the above-noted numerical ranges.

Further, for the pitch (p), a proportion of width (w) with respect to the part of a rib is referred to as (p−w)/w, and if set too small, this is like that, for the areas of (groove 13) surfaces where enhancement of heat dissipation is desired, the surface areas of ribs 12 have equivalent proportions. For the ribs 12 made of a rubber, enhancement of the effect on heat dissipation due to an increase in surface area is little expectable, so that (p−w)/w has a minimal value specified to 1.0.

The turbulent generating concavo-convex part 5 (ribs 12 and grooves 13) may preferably have the extending direction a (refer to FIG. 7) making an angle θ with the tire-radial direction r, within a range of $-70° \leq θ \leq 70°$. The run flat tire 1 is a body of revolution, and flows of air along surfaces of the tire side portion 3 are biased by centrifugal forces to move radially outward, though a little. And, at the ribs 12, stagnant regions accrue behind influent air. For their reduction to enhance heat dissipation, the inclination to the radial direction r may preferably be set within the above-noted angle range.

Still more, the turbulent generating concavo-convex part 5 may have the extending direction a making an angle θ with tire-radial direction r, varied depending on the position in a prescribed tire-radial direction r. For the pneumatic tire (run flat tire 1) in revolution, the flow of air has a different flow velocity depending on the radial position, so that the angle the extending direction a of the turbulent generating concavo-convex part 5 has to the radial direction r may preferably be varied depending on the radial position.

In addition, the turbulent generating concavo-convex part 5 may be divided to be discontinuous along the extending direction a. Further, the turbulent generating concavo-convex part may be unevenly arranged along a tire-circumferential direction. In this connection, for the ribs provided on a surface of the tire side portion 3, there accrue stagnant regions behind influent air, worsening heat dissipation in part, in comparison with the case of no provision of ribs. In order for elimination of such parts as worsened of heat dissipation to enhance the heat transfer in average, it may be effective for the turbulent generating concavo-convex part to be divided so as to be discontinuous in the extending direction.

Description is now made of a state of turbulent generation, with reference to FIG. 5. Along with a revolution of the run flat tire 1, a flow $S_1$ of air, as it has been in contact with a region of the tire side portion 3 where the turbulent generating concavo-convex part 5 does not extend, is separated from the tire side portion 3 by a rib 12, and rides over the rib 12. A stagnant flow part (region) $S_2$ of air then accrues at the rear side of that rib 12. Then, the flow $S_1$ of air re-start adhering to a bottom region before a subsequent rib 12, and is re-separated by this rib 12. Between this flow $S_1$ of air and re-separation by the rib 12, a stagnant flow part (region) $S_3$ of air accrues. It is supposed that an increased gradient of velocity (speed) be superior for enhancement of the heat dissipation efficiency.

In the present embodiment, the turbulent generating concavo-convex parts 5 are intermittently disposed along a tire-circumferential direction. However, alternating ribs 12 and grooves 13 may be evenly arranged over an entirety of circumference, as a matter of course.

Second Embodiment

Figure 8:
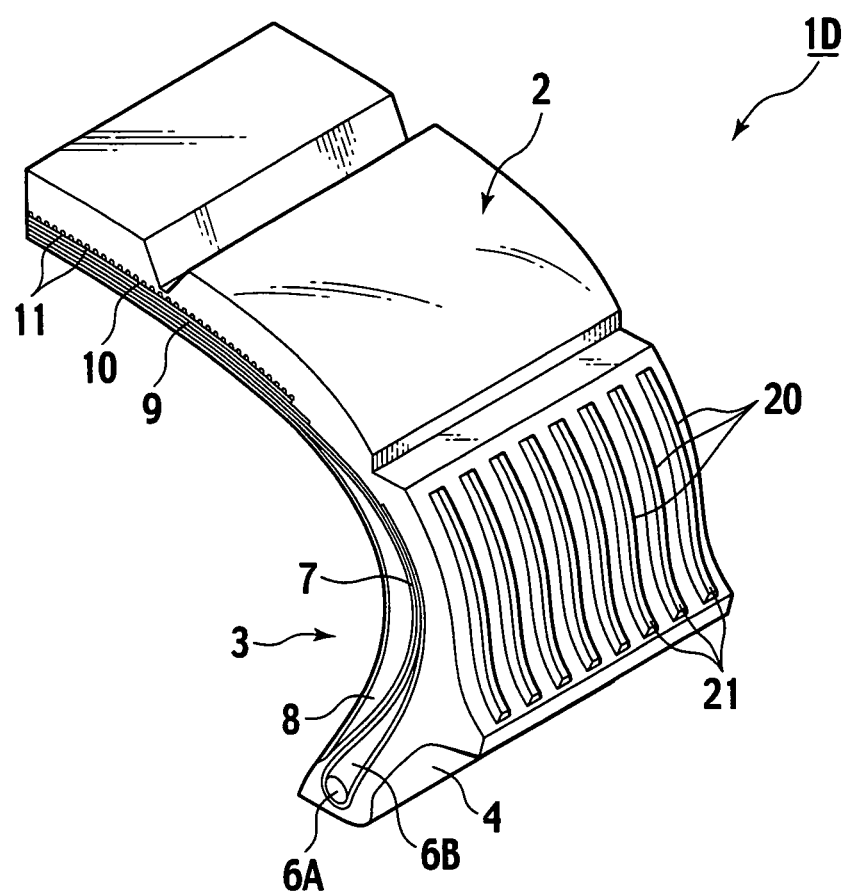
FIG. 8 is a perspective view, with a section of an essential portion, of a run flat tire according to a second embodiment of the present invention.
Figure 9:
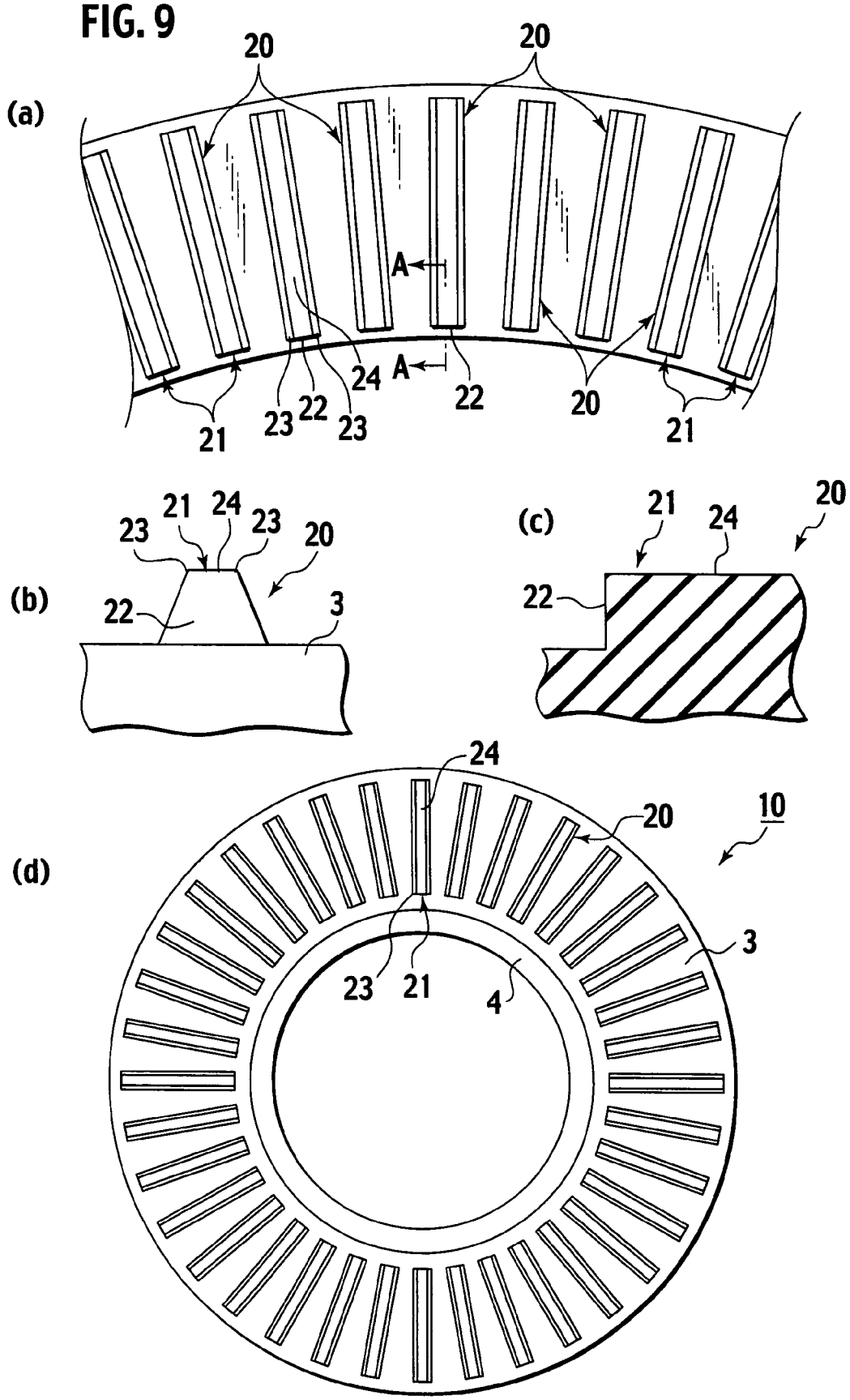
FIG. 9(a) is a view of the nm flat tire according to the second embodiment of the present invention, (b) is a side view of a tire-radially inner end of a rib seen from an axis of revolution of the tire, (c) is a section A-A of (a), and (d) is a side view of the run flat tire.

FIG. 8 and FIG. 9 show a run flat tire 1D as a pneumatic tire according to a second embodiment of the present invention.

FIG. 8 is a perspective view of the run flat tire 1D; FIG. 9(a), a side view of a plurality of ribs 20 of turbulent generating concavo-convex parts provided to a tire side portion 3; FIG. 9(b), a side view of a tire-radially inner end (at the side of an axis of revolution of the tire) of a rib seen from the tire revolution axis side; FIG. 9(c), a section A-A of FIG. 9(a); and FIG. 9(d), a side view of the run flat tire. It is noted that, for the run flat tire 1D according to the present embodiment, like parts to the run flat tire 1 according to the first embodiment are designated by like reference characters, to eliminate redundancy.

For the run flat tire 1D in the present embodiment, the general configuration is like to the first embodiment described, and is made up by a tread portion 2 to be brought into contact with a road surface, tire side portions 3 at both sides of the tire, and bead portions 4 provided along open edges of the tire side portions 3.

In the run flat tire 1D according to the present embodiment, an outside of each tire side portion 3 is entirely formed as a turbulent generating concavo-convex part. The run flat tire 1D has a plurality of ribs (convexed stripes) 20 arrayed on a surface at the outside of the tire side portion 3, so as to extend along substantially identical directions to radial directions r. Those ribs 12 are set to have an identical height along tire-radial directions r. The ribs 12 are mutually set to a constant pitch. As shown in FIGS. 9(a) to (c), each rib 20 has, at a tire-radially inner end 21 thereof a rising face 22 rising from the outside surface of the tire side portion 3, the rising face 22 crossing a top side 24, where it has ridges 23 and 23.

It is now noted that the ribs 20 are set to have, between the height (h) and the pitch (p) and a width (w), such a relationship that $1.0 \leq p/h \leq 50.0$, and a relationship met such that $1.0 \leq (p-w)/w \leq 100.0$. For the ribs, the ratio (p/h) of the pitch (p) and the height (h) may preferably be specified within a range of $2.0 \leq p/h \leq 24.0$, more preferably within $10.0 \leq p/h \leq 20.0$, for enhancement of heat transfer at surfaces of the tire side portion.

In the present embodiment, the tire side portion 3, which has a greater tendency for deteriorations to occur than other portions, is provided with the ribs 20 arranged at a prescribed pitch, thereby allowing heat dissipation of the tire side portion 3 to be promoted with turbulent flows of air generated at the ribs 20. The tire is made of a rubber material with a bad heat conductivity, and for the heat dissipation, a greater effect is expectable by promoting turbulent generation to have turbulent air flows directly hitting the tire side portion, than having an expanded radiation area for heat dissipation to be promoted.

There can be achieved an enhanced temperature reducing effect at the tire side portion 3, in particular for a pneumatic tire that has a tire side portion 3 with a tendency for a failure to occur in part in a long service relative to other portions, such as a TBR (truck bus radial) or a run flat tire 1D having a tire side portion 3 provided with reinforcing rubber crescents, or a heavy-load-oriented tire.

The (turbulent) flows of air specified by p/h, as above, fail to find ways at the outside surface of the tire side portion 3 if the pitch (p) is carved too small, that is, if the pitch (p) gets narrower, and have a condition like absence of ribs 20 formed in shape, to be hit if the pitch (p) is over-widened, so that they may preferably be set within the above-noted numerical ranges.

Further, for the pitch (p), a proportion of width (w) with respect to a rib 20 is referred to (p−w)/w, and if set too small, this is like that, for the areas of surfaces (at the outside of the tire side portion) where enhancement of heat dissipation is desired, the surface areas of the ribs 20 have equivalent proportions. For the ribs 12 made of a rubber, enhancement of the effect on heat dissipation due to an increase in surface area is little expectable, so that (p−w)/w has a minimal value specified to 1.0.

The rib 20 may preferably have an extending direction a (refer to FIG. 7) making an angle θ with a tire-radial direction r, within a range of $-70° \leq \theta \leq 70°$. The run flat tire 1 is a body of revolution, and flows of air along surfaces of the tire side portion 3 are biased by centrifugal forces to move radially outward, though a little. And, at the ribs 20, stagnant regions accrue behind influent air. For their reduction to enhance heat dissipation, the inclination to the radial direction r may preferably be set within the above-noted angle range.

In addition, the rib 20 may be divided to be discontinuous along the extending direction a. Further, the ribs 20 may be unevenly arranged, with uneven pitches, along a tire-circumferential direction. In this connection, for the rib 20 provided on the outside surface of the tire side portion 3, there accrue stagnant regions behind influent air, worsening heat dissipation in part, in comparison with the case of no provision of ribs 20. In order for elimination of such parts as worsened of heat dissipation to enhance the heat transfer in average, it may be effective for the ribs 20 to be divided so as to be discontinuous in the extending direction.

For the run flat tire 1D according to the present embodiment, along with a revolution of the tire, a flow of air, as it has been in contact with a region of the outside surface of the tire side portion 3 where the ribs 20 do not extend, is separated from the outside surface of the tire side portion 3 by a rib 20, and rides over the rib 20. A stagnant flow part (region) of air then accrues at the rear side of that rib 20. Then, the flow of air re-start adhering to a bottom region before a subsequent rib 20, and is re-separated by this rib 20. Between this flow of air and re-separation by the rib 20, a stagnant flow part (region) of air accrues. It is supposed that an increased gradient of velocity (speed) be superior for enhancement of the heat dissipation efficiency.

Further, for the run flat tire 1D according to the present embodiment in which each rib 20 has ridges 23 at a tire-radially inner end thereof, it is supposed that a flow of air is separated at an edge 23 as a start point, and caused to swirl, while moving along a direction in which centrifugal forces act. Therefore, this edge 23 may be disposed at a radially inner side of a location where temperature reduction is most desired, thereby allowing a selective enhancement of heat dissipation. Accordingly, the rib 20 may have a divided structure along a tire-radial direction, so that a plurality of ridges 23 are arranged along the tire-radial direction, allowing for an enlarged region for heat dissipation by flows of swirling air having those ridges 23 as start points, as well.

Figure 18:
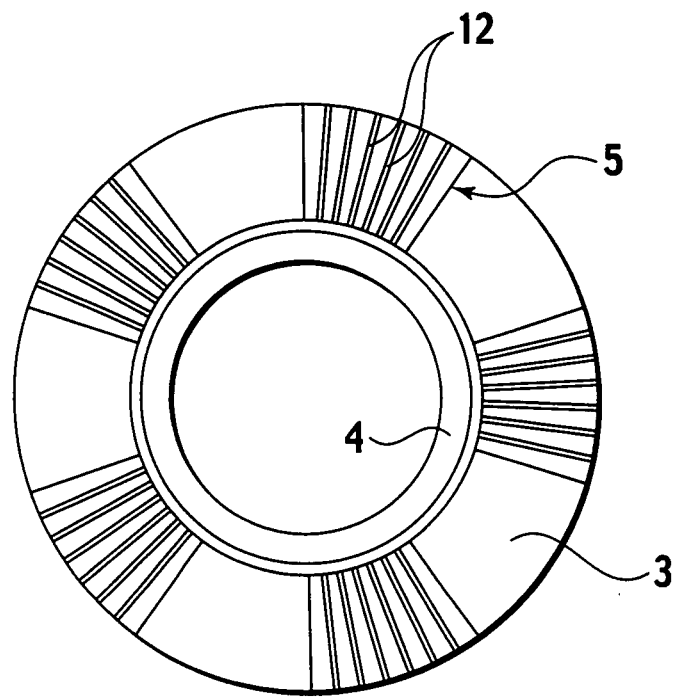
FIG. 18 is a side view of turbulent generating concavo-convex parts of run flat tire according to a modification.
Figure 19:
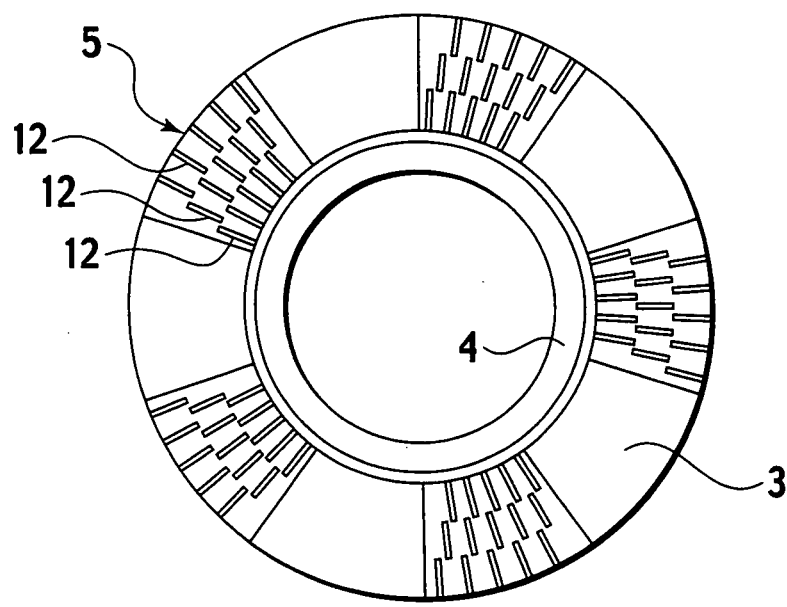
FIG. 19 is a side view of turbulent generating concavo-convex parts of run flat tire according to a modification.
Figure 20:
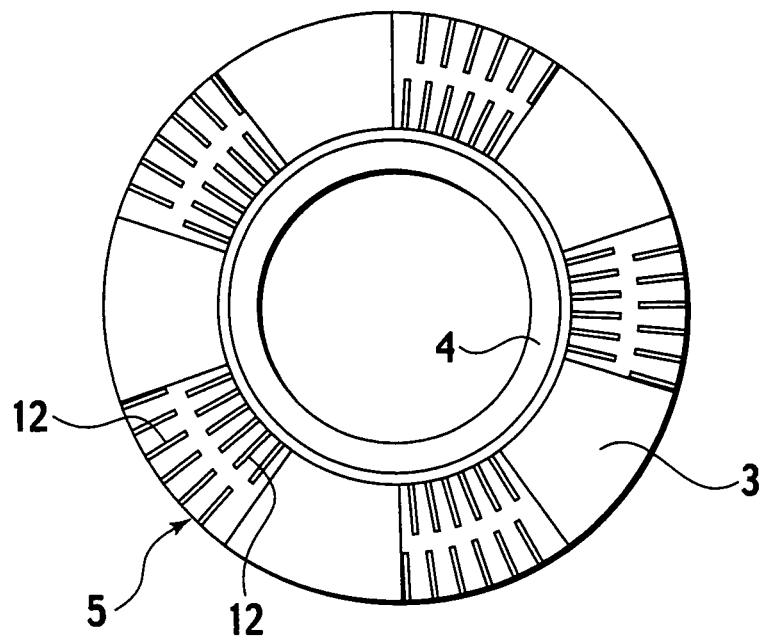
FIG. 20 is a side view of turbulent generating concavo-convex parts of run flat tire according to a modification.
Figure 21:
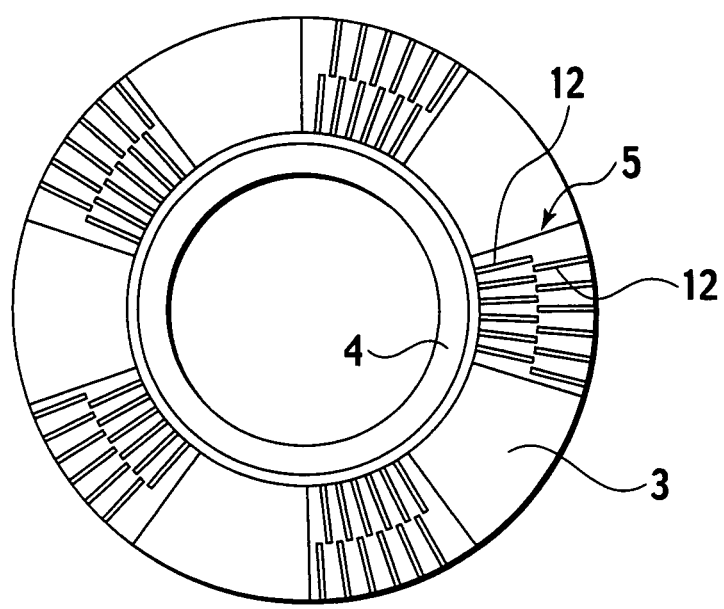
FIG. 21 is a side view of turbulent generating concavo-convex parts of run flat tire according to a modification.

In the second embodiment, ribs 20 are arranged at identical intervals. However, as shown in FIG. 18, turbulent generating concavo-convex parts each composed of a set of ribs 12 may be intermittently arranged along a circumferential direction of the tire.

(Modification-1 of Ribs)

Figure 10:
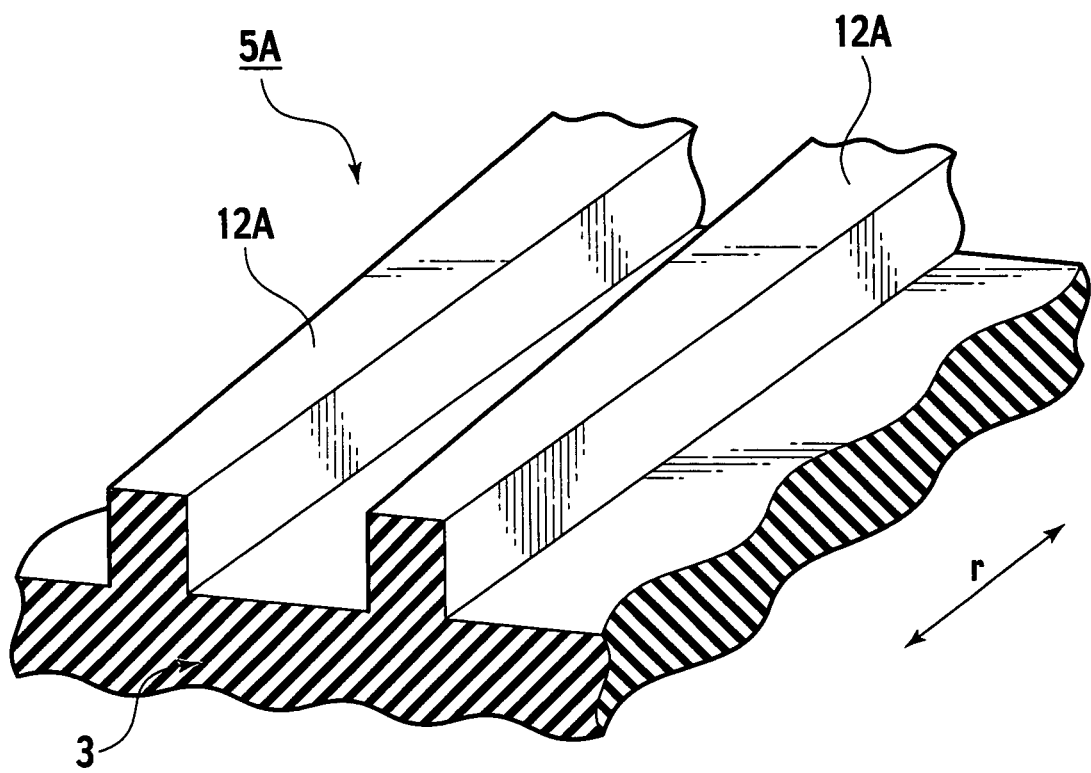
FIG. 10 is a detailed perspective view of an essential portion of ribs of run flat tire according to a modification-1.

FIG. 10 shows a modification-1 of ribs applicable to a run flat tire 1 or 1D according to the first or second embodiment described. It is now noted that, for description of modifications that follow, like or similar parts to the run flat tire 1 according to the first embodiment are designated by like or similar reference characters.

Here, a turbulent generating concavo-convex part 5A is configured with ribs 12A each formed with a gradually reduced width as it extends in a sense of a tire-radial direction r. This modification-1 is applicable as a design for a tire side portion 3 to be adapted for an enhanced efficiency of heat dissipation with ribs 12A to be each widen, in particular, at regions needing heat dissipation. That is, the rib 12A is allowed to have a ratio (p/h) of pitch (p) and height (h) varied in dependence on the position in the tire-radial direction r, for an optimal efficiency of heat dissipation. It is noted that, in this modification as well as others described later on, the ratio (p/h) of pitch (p) and height (h) may preferably meet such a relationship that $1.0 \leq p/h \leq 50.0$, and $1.0 \leq (p-w)/w \leq 100.0$, or more preferably, such a relationship that $2.0 \leq p/h \leq 24.0$.

(Modification-2 of Ribs)

Figure 11:
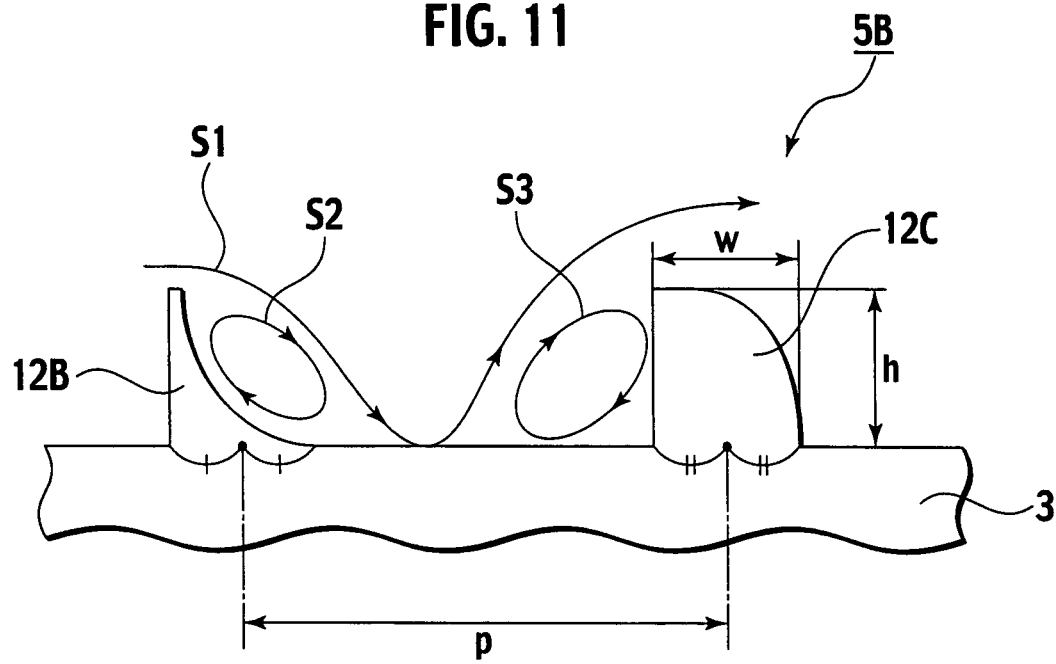
FIG. 11 is a sectional illustration of ribs of run flat tire according to a modification-2.

FIG. 11 shows a modification-2. As shown in FIG. 11, according to the modification-2, a turbulent generating concavo-convex part 5B is configured with alternate provision along a direction of tire revolution, of a combination of: a rib 12B substantially in the form of a right rectangle in a section in a tire-circumferential direction, and curved in a slightly concaved manner along a slope at the back of a side where a flow $S_1$ of air hits; and a rib 12C substantially in the form of a rectangle in a section, and rounded in an R-form at a corner at the back of a side where the flow $S_1$ of air hits. Such turbulent generating concavo-convex parts 5B composed of ribs 12B and 12C are intermittently arranged along a direction of rotation of a tire side portion.

For the turbulent generating concavo-convex part 5B according to the modification-2, as shown in FIG. 11, the recessed slope at the back of rib 12B provides a space for a stagnant air flow $S_2$ to accrue, allowing for a reduced influence of stagnant air on a surface region as a radiating object between rib 12B and rib 12C.

(Modification-3 of Ribs)

Figure 12:
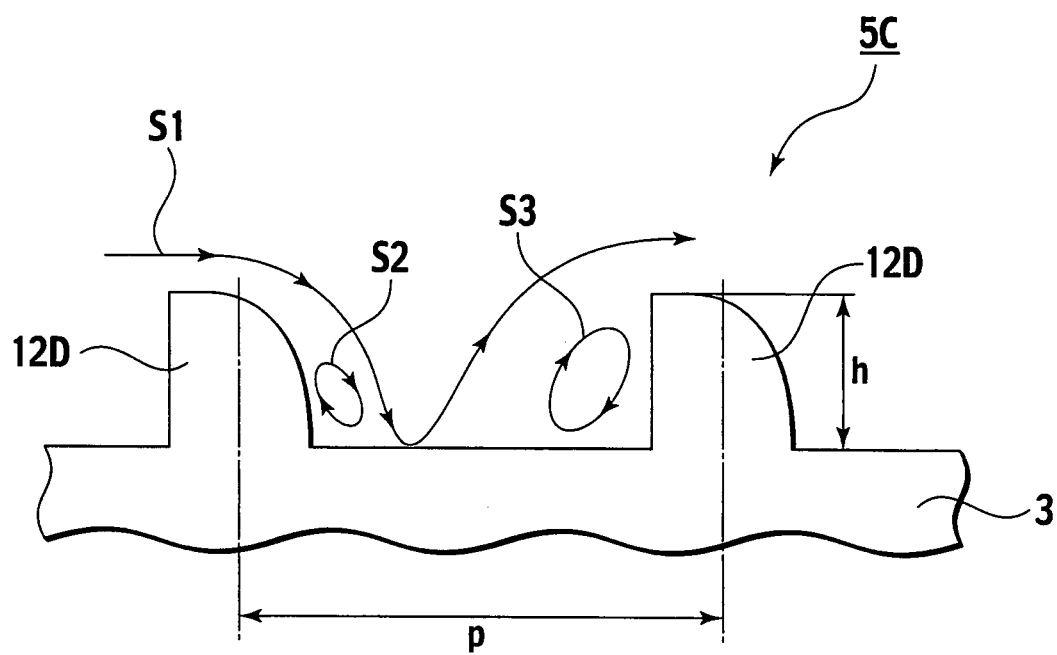
FIG. 12 is a sectional illustration of ribs of run flat tire according to a modification-3.

FIG. 12 shows a modification-3. As shown in FIG. 12, according to the modification-3, a turbulent generating concavo-convex part 5C is configured with a plurality of ribs 12D substantially in the form of a rectangle in a section, and each formed in an R-round at a corner at the back of a side where a flow $S_1$ of air hits, and arranged along a tire-radial direction r at a prescribed pitch p.

In the modification-3, a flow $S_1$ of air having ridden over a rib 12D moves along an R-side at the back of the rib 12D, entering between ribs 12D, allowing for a reduced space for an air flow $S_2$ to stagnate, whereby heat dissipation effect at the turbulent generating concavo-convex part 5C can be enhanced.

(Modification-4 of Ribs)

Figure 13:
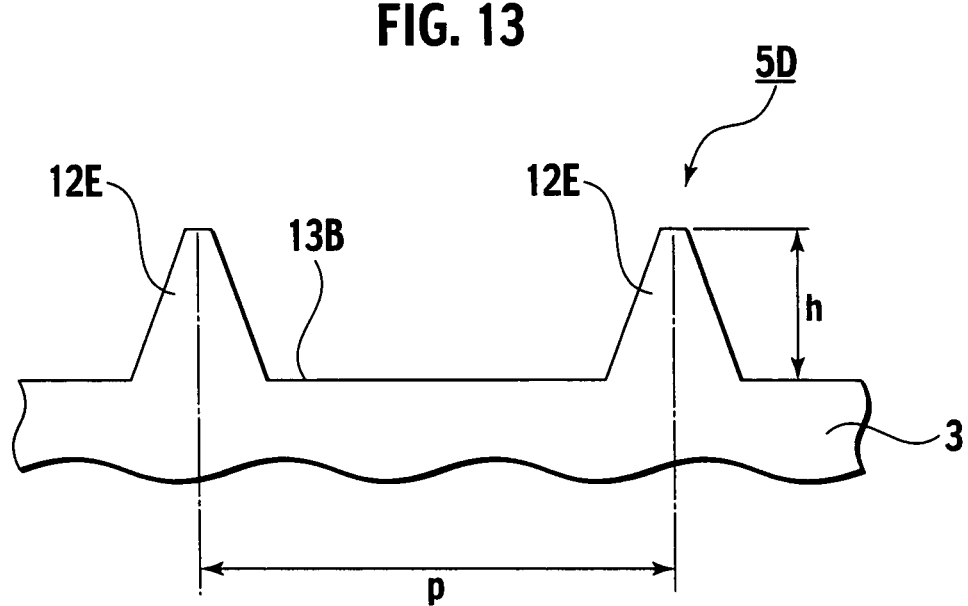
FIG. 13 is a sectional illustration of ribs of run flat tire according to a modification-4.

FIG. 13 shows a modification-4. According to the modification-4, a turbulent generating concavo-convex part 5D has ribs 12E thereof formed, at prescribed intervals, in a trapezoidal shape in a section in a direction of revolution.

(Modification-5 of Ribs)

Figure 14:
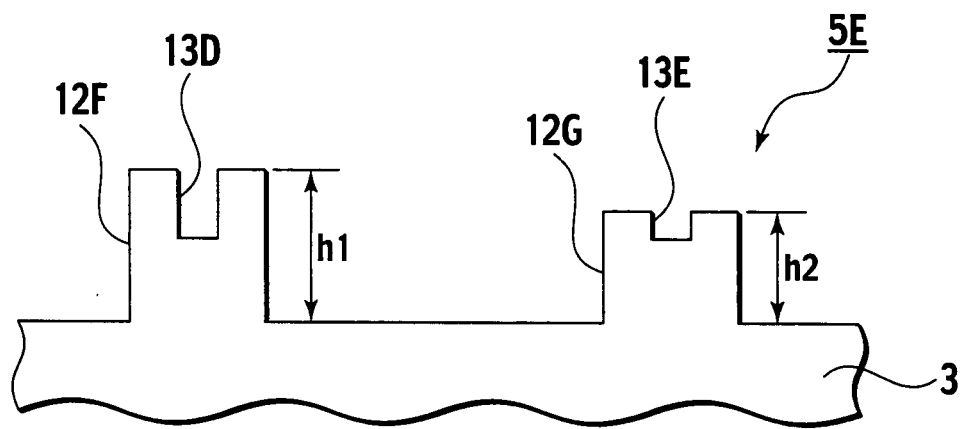
FIG. 14 is a sectional illustration of ribs of run flat tire according to a modification-5.

FIG. 14 shows a modification-5. In the modification-5, a turbulent generating concavo-convex part 5E is configured with alternate provision along a direction of tire revolution, of a combination of: a rib 12F rectangular in section; and a rib 12G having a height ($h_2$) slightly lower than a height ($h_1$) of the rib 12G. Moreover, the rib 12F is configured with a groove 13D formed in a top side thereof along a tire-radial direction r, and the rib 12G, configured with a groove 13E formed in a top side thereof along a tire-radial direction r. According to the modification-5, the grooves 13D and 13E formed in top sides of the ribs 12F and 12G afford generation of still complicate turbulent flows.

(Modification-6 of Ribs)

Figure 15:
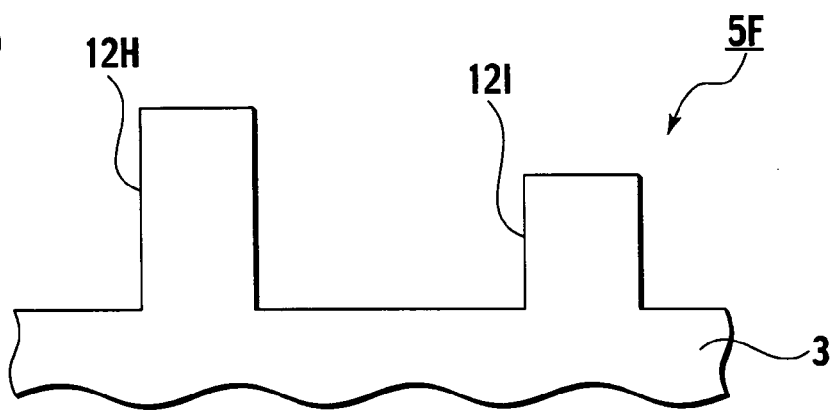
FIG. 15 is a sectional illustration of ribs of run flat tire according to a modification-6.

FIG. 15 shows a modification-6. In the modification-6, a turbulent generating concavo-convex part 5F is configured with alternate provision of a combination of: a rib 12H with a tall height; and a rib 12I with a low height. The difference in height between rib 12H and rib 12I generates turbulent flows, allowing for an enhanced heat dissipation efficiency on a surface between ribs 12H and 12I.

(Modification-7 of Ribs)

Figure 16:
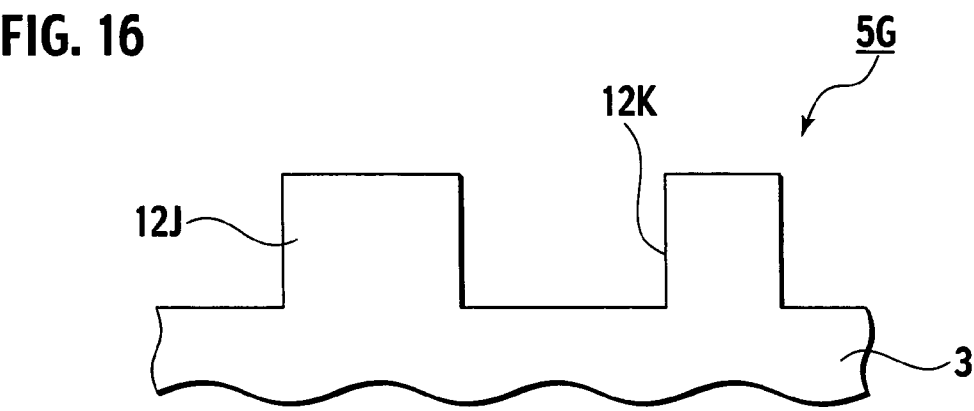
FIG. 16 is a sectional illustration of ribs of run flat tire according to a modification-7.

FIG. 16 shows a modification-7. In the modification-7, a turbulent generating concavo-convex part 5G is configured with alternate provision of a combination of ribs 12J and 12K mutually identical in height and different in width dimension.

(Modification-8 of Ribs)

Figure 17:
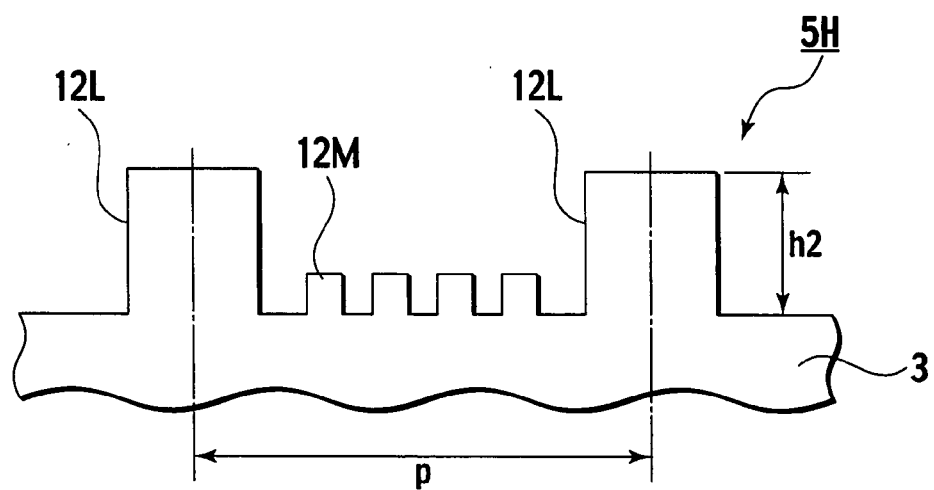
FIG. 17 is a sectional illustration of ribs of run flat tire according to a modification-8.

FIG. 17 shows a modification-8. In the modification-8, a turbulent generating concavo-convex part 5H has an array of ribs 12L rectangular in section, and a plurality of small ribs 12M arrayed on a bottom between ribs 12L.

(Other Modifications)

There will be described other modifications of turbulent generating concavo-convex parts. It is noted that in each modification to be described, reference character 5 designates a turbulent generating concavo-convex part, and reference character 12 designates a rib.

FIG. 18 to FIG. 21 show turbulent generating concavo-convex parts 5, in which sets of ribs 12 each having a trisected length in a tire-radial direction r or sets of centrally disconnected ribs 12 are arranged in a manner in which they are staggered from each other in a direction of revolution.

Figure 22:
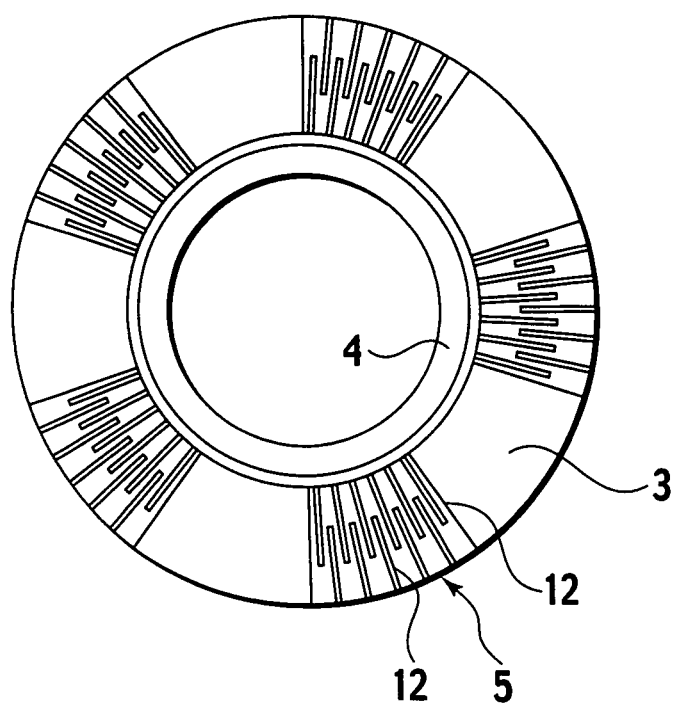
FIG. 22 is a side view of turbulent generating concavo-convex parts of run flat tire according to a modification.

FIG. 22 shows turbulent generating concavo-convex parts 5 each including an array of combinations of ribs 12 that have lengths overlapping each other at a central region of a length in a tire-radial direction r, and are disposed in a manner in which they are staggered to be separated from each other in a direction of revolution.

Figure 23:
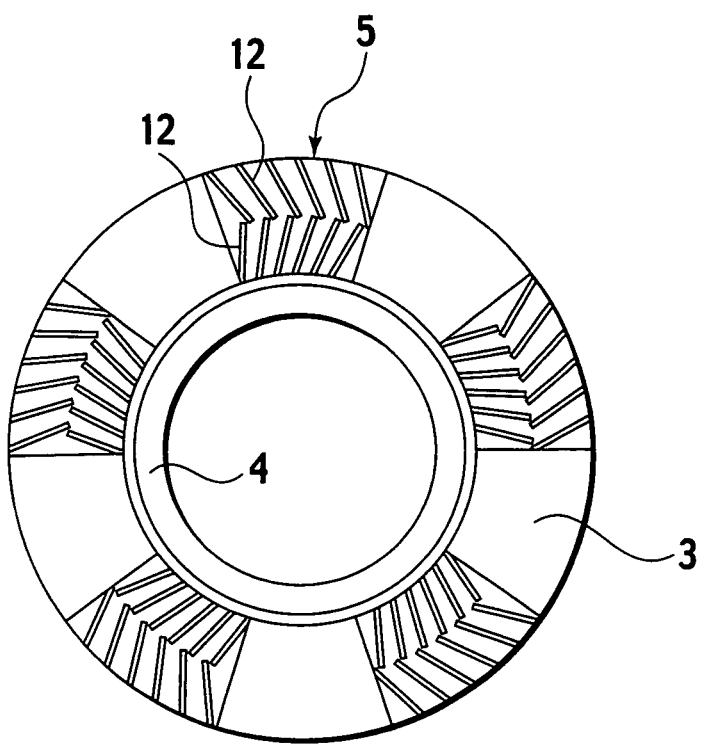
FIG. 23 is a side view of turbulent generating concavo-convex parts of run flat tire according to a modification.

FIG. 23 shows turbulent generating concavo-convex parts 5 as an example of combinations each composed of a tire-radially outer rib 12 and an inner rib 12, which are separated from each other at a central region of a length in a tire-radial direction r, and inclined at directions different from each other.

Figure 24:
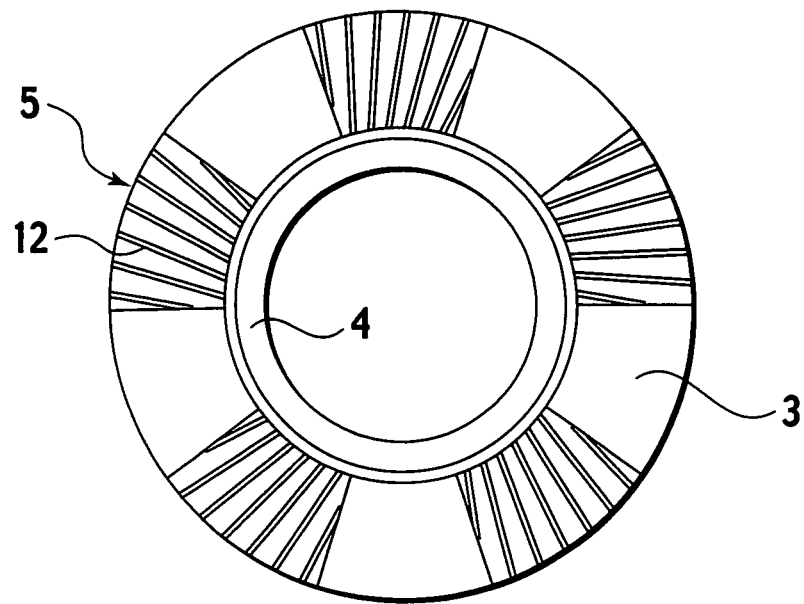
FIG. 24 is a side view of turbulent generating concavo-convex parts of run flat tire according to a modification.

FIG. 24 shows turbulent generating concavo-convex parts 5 each configured with a plurality of parallel ribs 12 each extending in an oblique direction to a tire-radial direction r.

Figure 25:
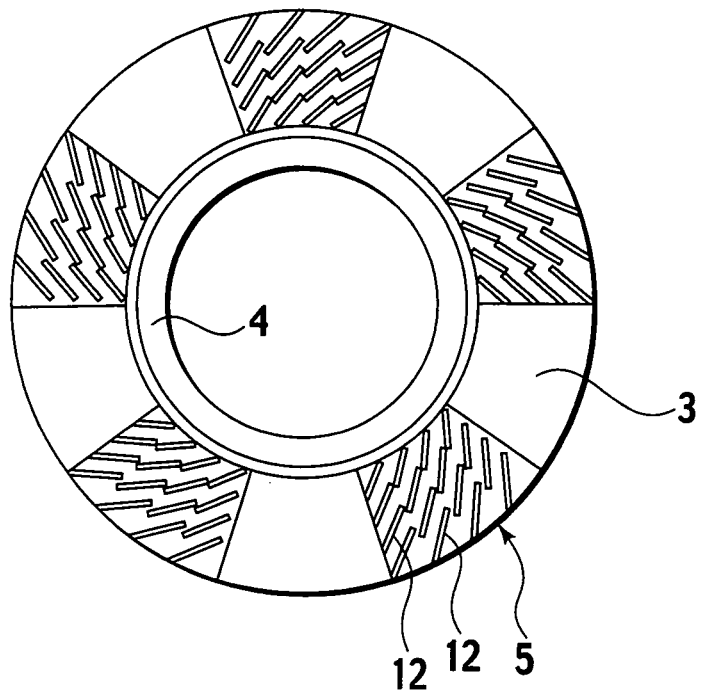
FIG. 25 is a side view of turbulent generating concavo-convex parts of run flat tire according to a modification.
Figure 26:
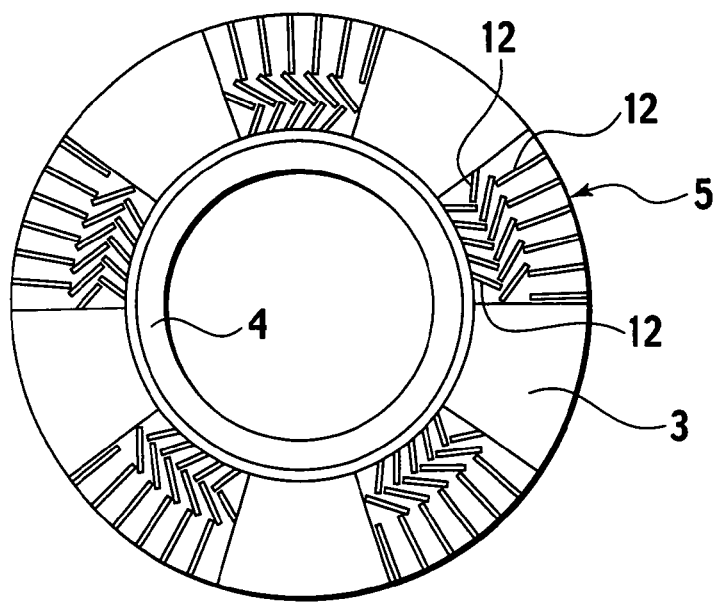
FIG. 26 is a side view of turbulent generating concavo-convex parts of run flat tire according to a modification.

FIG. 25 and FIG. 26 show turbulent generating concavo-convex parts 5 each including an array of sets of tire-radially separated ribs 12 each having a different direction to a tire-radial direction r.

Figure 27:
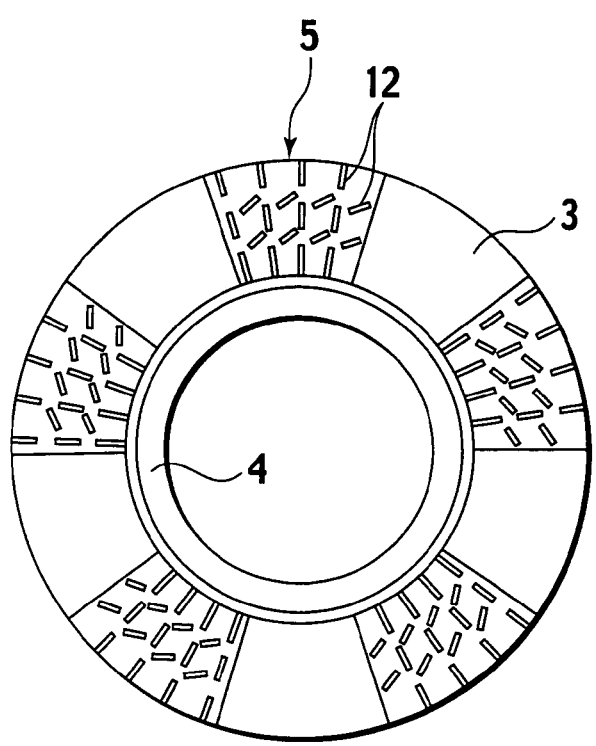
FIG. 27 is a side view of turbulent generating concavo-convex parts of run flat tire according to a modification.

FIG. 27 shows turbulent generating concavo-convex parts 5 each including sets of tire-radially separated ribs 12, and a set of obliquely arranged ribs 12.

Figure 28:
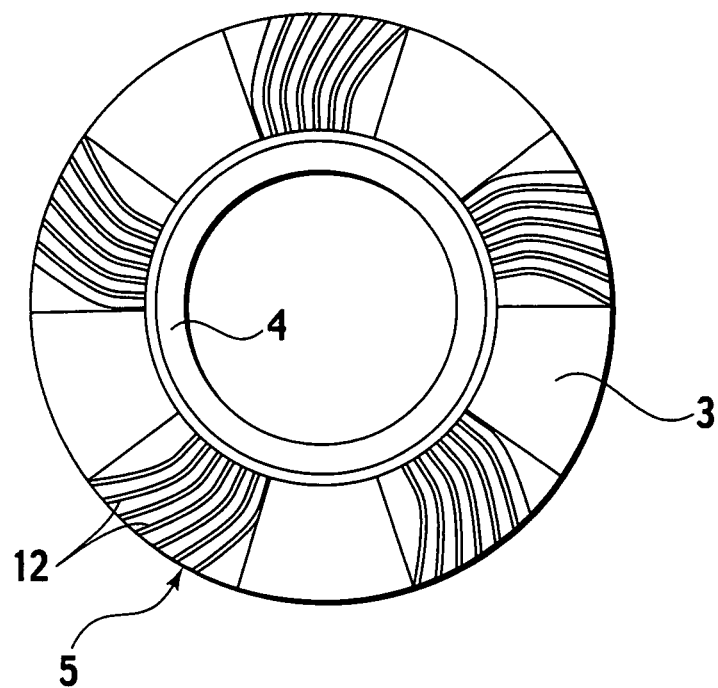
FIG. 28 is a side view of turbulent generating concavo-convex parts of run flat tire according to a modification.

FIG. 28 shows turbulent generating concavo-convex parts 5 each including a plurality of ribs 12 each formed in a tire-radial direction r, in a manner in which it is gradually inclined relative to the tire-radial direction r, as it extends tire-radially outwards.

In embodiments shown in FIG. 18 to FIG. 28, turbulent generating concavo-convex parts 5 are intermittently arranged in a tire-circumferential direction. However, turbulent generating concavo-convex parts 5 may be continuously formed over an entire circumference.

Description is now made of examples. For embodiment examples and comparative examples, a duration drum test was performed on the completed vulcanized tires under the following conditions. For the embodiment examples, as listed in a Table-1 below, those sampled had varied p/h, (p−w)/w, and θ of turbulent generating concavo-convex parts similar in configuration to the afore-mentioned first embodiment. For results of the duration drum test (durability estimation), duration distances before occurrence of a failure were represented as indices, which are listed in Table-1 and Table-2 below.

| | |
|---|---|
| Tire size: | 285/50R20 |
| Used rim: | 8JJx20 |
| Inner pressure: | 0 kPa |
| Load: | 9.8 kN |
| Speed: | 90 km/h |

It is noted that p/h, (p−w)/w, and θ were as defined herein.

TABLE 1

| Parameters | Comp. Ex | Emb. Ex-1 | Emb. Ex-2 | Emb. Ex-3 | Emb. Ex-4 | Emb. Ex-5 | Emb. Ex-6 | Emb. Ex-7 | Emb. Ex-8 | Emb. Ex-9 | Emb. Ex-10 |
|---|---|---|---|---|---|---|---|---|---|---|---|
| p/h | — | 1.5 | 3 | 8 | 12 | 15 | 24 | 48 | 15 | 15 | 15 |
| (p − w)/w | — | 2 | 5 | 7 | 23 | 29 | 47 | 95 | 29 | 29 | 29 |
| θ | — | 0 | 0 | 0 | 0 | 0 | 0 | 0 | 45 | 10 | 0 |
| θ1 | — | 90 | 90 | 90 | 90 | 90 | 90 | 90 | 90 | 90 | 90 |
| h | — | 2 | 2 | 2 | 2 | 2 | 2 | 2 | 2 | 2 | 2 |
| w | — | 1 | 1 | 1 | 1 | 1 | 1 | 1 | 1 | 1 | 1 |
| Durability | 100 | 102 | 120 | 130 | 145 | 146 | 102 | 101 | 102 | 148 | 146 |

TABLE 2

| Parameters | Emb. Ex-11 | Emb. Ex-12 | Emb. Ex-13 | Emb. Ex-14 | Emb. Ex-15 | Emb. Ex-16 | Emb. Ex-17 | Emb. Ex-18 | Emb. Ex-19 | Emb. Ex-20 | Emb. Ex-21 |
|---|---|---|---|---|---|---|---|---|---|---|---|
| p/h | 15 | 15 | 15 | 15 | 15 | 15 | 15 | 15 | 15 | 15 | 15 |
| (p − w)/w | 29 | 6.5 | 44 | 89 | 99 | 59 | 14 | 9 | 6.5 | 29 | 29 |
| θ | −4.5 | 0 | 0 | 0 | 0 | 0 | 0 | 0 | 0 | 0 | 0 |
| θ1 | 90 | 90 | 90 | 90 | 90 | 90 | 90 | 90 | 90 | 20 | 110 |
| h | 2 | 0.5 | 3 | 7 | 2 | 2 | 2 | 2 | 2 | 2 | 2 |
| w | 1 | 1 | 1 | 1 | 0.3 | 0.5 | 2 | 3 | 4 | 1 | 1 |
| Durability | 102 | 105 | 135 | 102 | 130 | 142 | 140 | 120 | 110 | 138 | 146 |

It will be seen from the Table-1 above that the durability is enhanced for ratios (p/h) of pitch (p) and height (h) of rib within a range of 1 or more. It will also be seen that the durability is enhanced if, for the pitch (p), the proportion (p−w)/w with respect to width (w) of rib resides within a range of 2 or more. Further, as apparent from Table-2, the rib height (h) is preferable within a range 0.5 to 3 mm, and the width (w) is preferable within a range of 0.5 to 3 mm.

Figure 29:
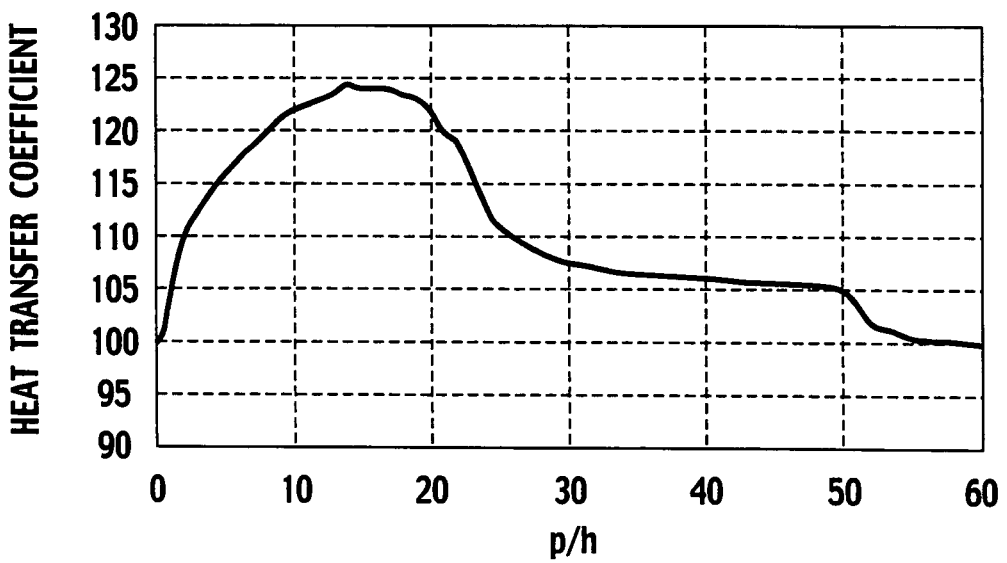
FIG. 29 is a graph of a relationship between heat transfer coefficient and p/h in embodiment.

FIG. 29 shows in a graph a relationship between heat conductivity and ratio (p/h) of pitch (p) and height (h) of rib, where the heat conductivity is enhanced for a range of p/h of 1.0 or more and 50.0 or less. It is noted that in graphs of FIG. 29 and FIG. 30, the axis of ordinate represents a heat transfer determined from a tire surface temperature and a when a constant quantity of heat generated with a constant voltage imposed on a heater was sent by a blower. Further, as seen from FIG. 30, the durability is enhanced with a better heat transfer, within a range of p/h of 2.0 to 24.0. Accordingly, the turbulent generating concavo-convex parts should be desirable within a range of $1.0 \leq p/h \leq 50.0$, preferably within a range of $2.0 \leq p/h \leq 240.0$, more preferably within a range of $10.0 \leq p/h \leq 20.0$.

Figure 30:
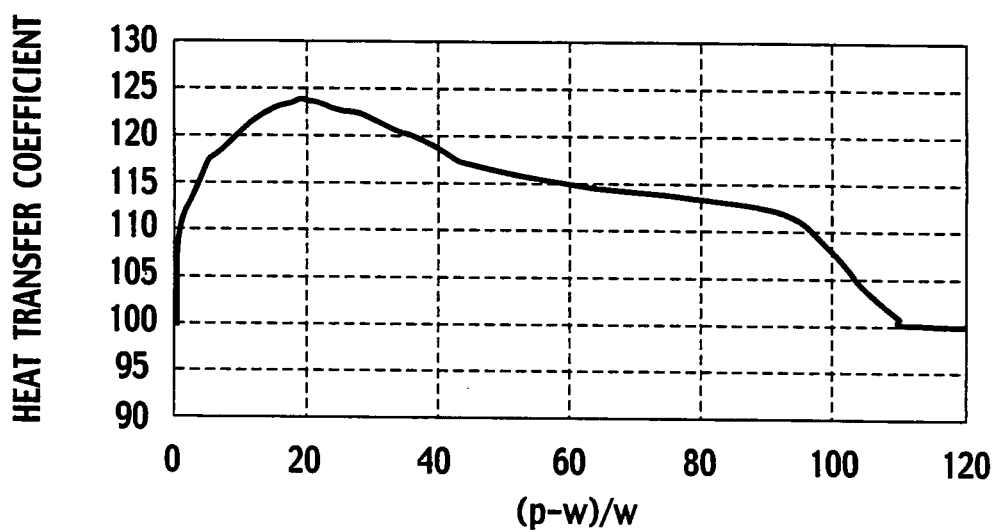
FIG. 30 is a graph of a relationship between heat transfer coefficient (p−w)/w in embodiment.

FIG. 30 shows in a graph a relationship between heat transfer and (p−w)/w, wherefrom it is seen that the heat transfer is enhanced with a relationship to be met such that $10 \leq (p-w)/w \leq 100.0$, preferably $4.0 \leq (p-w)/w \leq 39.0$, for example $10.0 \leq (p-w)/w \leq 39.0$.

As will be seen from embodiment example-11 to embodiment example-14, the durability is enhanced with a rib height (h) within a range of 0.5 mm $\leq h \leq$ 7 mm, for example 0.6 $\leq h \leq$ 7 mm, more preferably within a range of 0.5 mm $\leq h \leq$ 3 mm.

As will be seen from embodiment example-15 to embodiment example-19, the durability is enhanced with a rib width (w) within a range of 0.3 mm $\leq w \leq$ 4 mm, more preferably within a range of 0.5 mm $\leq w \leq$ 3 mm.

Figure 31:
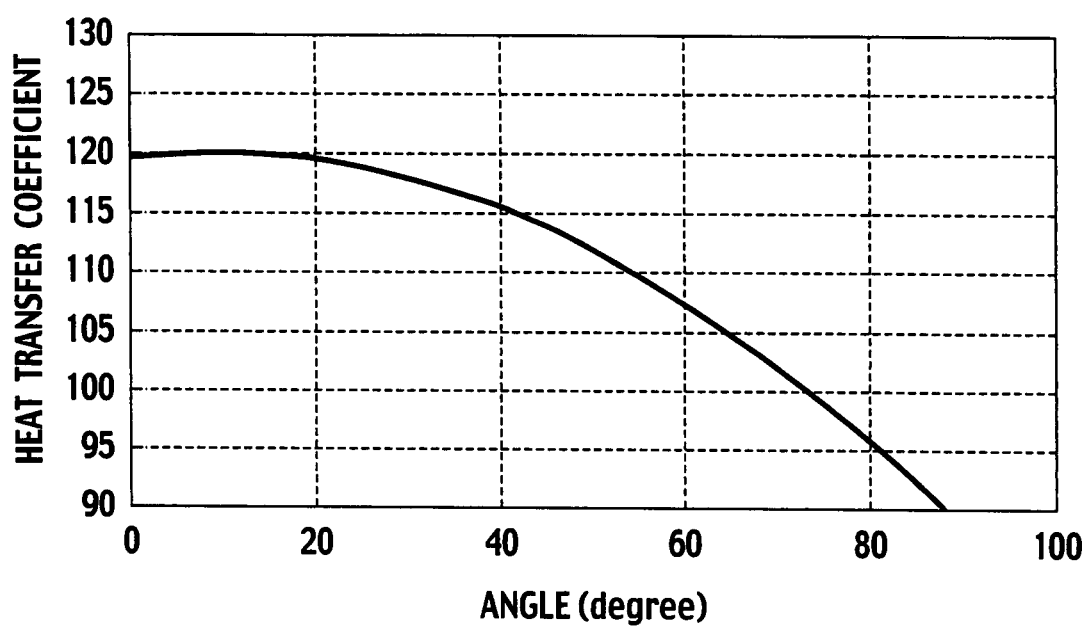
FIG. 31 is a graph of a relationship between heat transfer coefficient and angle θ of inclination in embodiment.

Further, as apparent from FIG. 31, for the ribs, the angle θ that the extending direction makes with a tire-radial direction r is desirable within a range of 0° to 70°. It will be seen that like heat transfer may be given within a range of 0° to −70°, as well.

Other Embodiments

It will be understood that the present invention is not limited to the drawings and description as part of disclosure of the foregoing embodiments. For artisan, various substitutions, examples, and techniques for use of the embodiments may be apparent from the disclosure.

For example, the embodiments applied to a run flat tire as a pneumatic tire may well be applied to other types of tires, such as an off-road tire (ORR), truck bus tire (TBR), etc.

Figure 32:
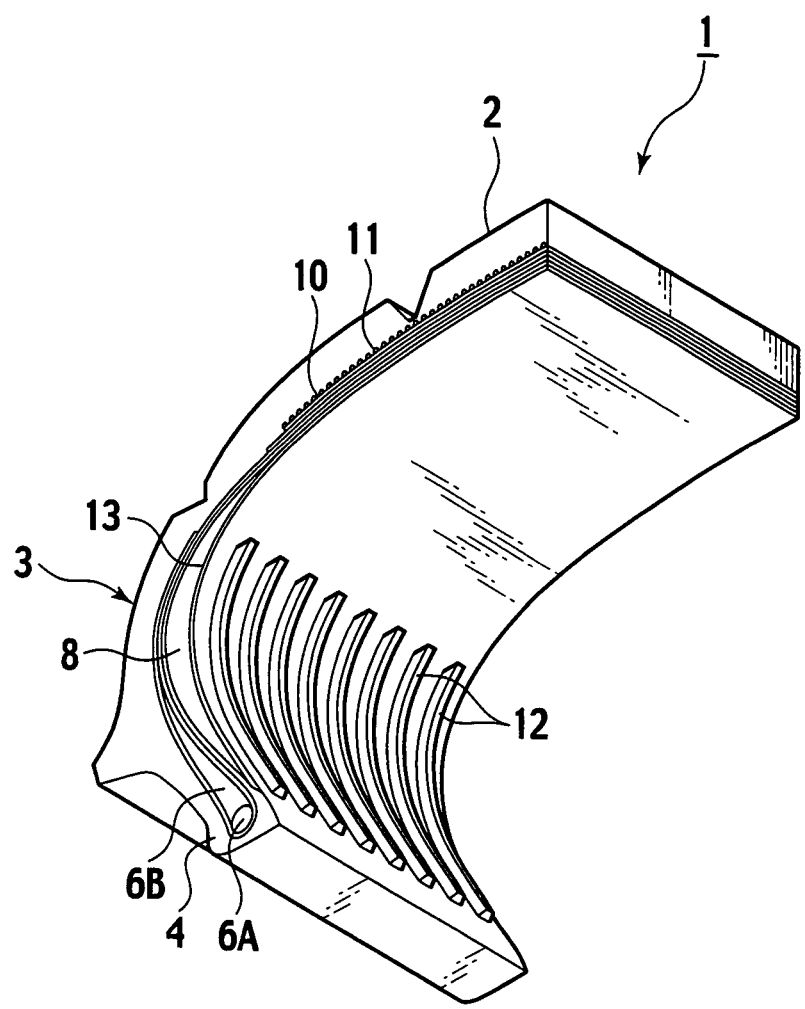
FIG. 32 is a perspective view of a pneumatic tire according to another embodiment of the present invention.
Figure 33:
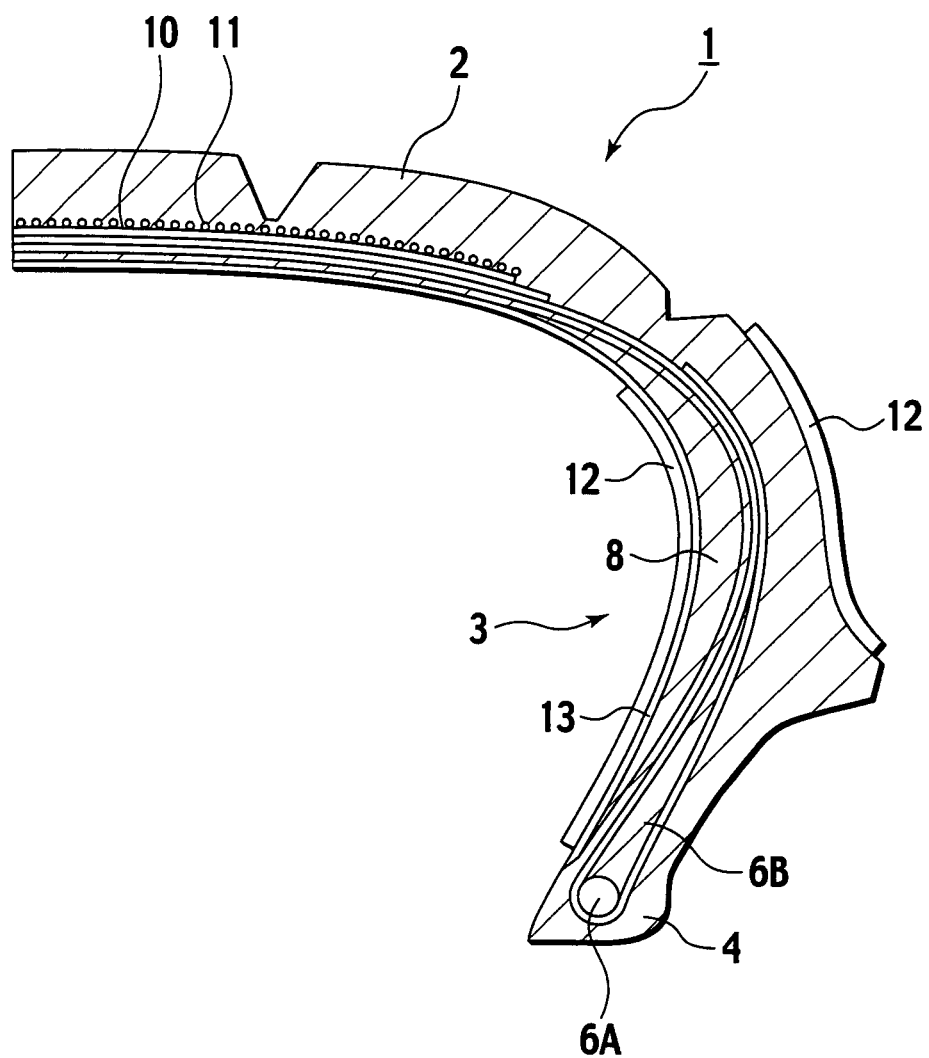
FIG. 33 is a sectional illustration of the pneumatic tire according to the other embodiment of the present invention.

Further, although, in the embodiments described, ribs 12 are formed on an outside of a tire side portion 3, they may be formed also on an inside of a tire side portion 3, as shown in FIG. 32 and FIG. 33. In a run flat tire 1 shown in FIG. 32 and FIG. 33, ribs 12 are arranged on a surface of an inner liner 13 provided on an inside of a tire side portion 3, while ribs 12 may be formed on a surface of a side wall reinforcing layer 8, and covered with an inner liner 13.

INDUSTRIAL APPLICABILITY

As will be seen from the foregoing description, a pneumatic tire according to the present invention, which is configured with turbulent generating concavo-convex parts arranged within a prescribed range on a surface of a tire side portion to thereby control failure occurrence, for an enhanced durability of pneumatic tire, is applicable to techniques for enhancement of reliability of a pneumatic tire having a tire side portion with a tendency for a failure to occur in part in comparison with other portions, such as a run flat tire having a tire side portion provided with reinforcing rubber crescents, or a TBR having a tire side portion where a carcass end is located.

The invention claimed is:

1. A pneumatic tire wherein
a tire side portion comprises a concave-convex part extending along at least part of an outer side of the tire side portion;
the concavo-convex part is composed of grooves and ribs,
for the ribs, letting h be a height, p be a pitch, and w be a width, a relationship is met such that $1.0 \leq p/h \leq 50.0$, and $5 \leq (p-w)/w \leq 100$,
wherein for the ribs, the height (h) is such that $0.5 \text{ mm} \leq h \leq 7 \text{ mm}$, and the width (w) is such that $0.3 \text{ mm} \leq w \leq 4 \text{ mm}$.

2. The pneumatic tire according to claim 1, wherein for the ribs, a ratio (p/h) or the pitch (p) and the height (h) is such that $2.0 \leq p/h \leq 24.0$.

3. The pneumatic tire according to claim 1, wherein for the ribs, a ratio (p/h) of the pitch (p) and the height (h) is such that $10.0 \leq p/h \leq 20.0$.

4. The pneumatic tire according to claim 1, wherein the concavo-convex part has an extending direction making an angle $\theta$ with a tire-radial direction, within a range of $-70° \leq \theta \leq 70°$.

5. The pneumatic tire according to claim 1, wherein the ribs have ridges at least at radially inner ends thereof.

6. The pneumatic tire according to claim 1, wherein the concavo-convex part has an extending direction making an angle $\theta$ with a tire-radial direction, varied depending on a tire-radial position.

7. The pneumatic tire according to claim 1, wherein the concavo-convex part is divided to be discontinuous in the extending direction.

8. The pneumatic tire according to claim 1, wherein the concavo-convex part is unevenly arranged along a tire-circumferential direction.

9. A pneumatic tire wherein
a tire side portion comprises a concavo-convex part extending along at least part of an outer side of the tire side portion;
the concavo-convex part is composed of grooves and ribs, and
for the ribs, letting h be a height, p be a pitch, and w be a width, a relationship is met such that $1.0 \leq p/h \leq 50.0$, and $10.0 \leq (p-w)/w \leq 39.0$,
wherein the pneumatic tire is a heavy-load-oriented tire.

10. A pneumatic tire wherein,
a tire side portion comprises a concavo-convex part extending along at least part of the tire side portion;
the concavo-convex part is composed of grooves and ribs; and
for the ribs, letting h be a height, p be a pitch, and w be a width, a relationship is met such that $10.0 \leq p/h \leq 20.0$, and $10.0 \leq (p-w)/w \leq 39.0$,
h is substantially constant in an extending direction of the ribs,
wherein the pneumatic tire is a run-flat tire.

* * * * *